(12) United States Patent
Inoguchi et al.

(10) Patent No.: US 7,616,382 B2
(45) Date of Patent: Nov. 10, 2009

(54) IMAGE OBSERVATION APPARATUS AND IMAGE OBSERVATION SYSTEM

(75) Inventors: Kazutaka Inoguchi, Kawasaki (JP); Shoichi Yamazaki, Yokohama (JP); Kenichi Saito, Yokohama (JP); Motomi Tsuyuki, Kawasaki (JP); Masakazu Tohara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/140,359

(22) Filed: Jun. 17, 2008

(65) Prior Publication Data
US 2008/0316606 A1 Dec. 25, 2008

(30) Foreign Application Priority Data
Jun. 20, 2007 (JP) ............... 2007-163070

(51) Int. Cl.
*G02B 27/14* (2006.01)
*G09G 5/00* (2006.01)

(52) U.S. Cl. ............ 359/629; 359/630; 359/633; 359/636; 359/638; 359/639; 359/640; 359/726; 345/9; 348/115; 349/11

(58) Field of Classification Search ........... 359/629, 359/630, 633, 636, 638–640, 726; 345/7, 345/8, 9; 348/115; 349/11
See application file for complete search history.

(56) References Cited

U.S. PATENT DOCUMENTS 5,751,494 A * 5/1998 Takahashi ............ 359/631
5,982,343 A 11/1999 Iba et al.
6,008,778 A 12/1999 Takahashi et al.
7,193,585 B2 * 3/2007 Takagi ............ 345/8
7,391,575 B2 * 6/2008 Inoguchi ............ 349/11

FOREIGN PATENT DOCUMENTS

| JP | 07-274097 A | 10/1995 |
| JP | 10-246865 A | 9/1998 |
| JP | 11-326820 A | 11/1999 |

* cited by examiner

*Primary Examiner*—Evelyn A. Lester
(74) *Attorney, Agent, or Firm*—Canon USA Inc. IP Division

(57) ABSTRACT

The image observation apparatus includes a first image-forming element and a second image-forming element each of which forms an original image, and an optical system configured to introduce light fluxes from the first and second image-forming elements to an exit pupil position of the optical system where an eye of an observer is placed. The optical system includes an optical surface as a single surface that reflects the light flux from the first image-forming element and transmits the light flux from the second image-forming element. The first image-forming element and the second image-forming element respectively form a first original image and a second original image that correspond to different viewing fields from the exit pupil position. The apparatus combines plural original images to enable observation of one combined image and that can suppress generation of light scattering.

6 Claims, 25 Drawing Sheets

IMAGE OBSERVATION APPARATUS AND IMAGE OBSERVATION SYSTEM

BACKGROUND OF THE INVENTION

The present invention relates to an image observation apparatus such as a head-mounted display (HMD) which introduces light fluxes from plural image-forming elements to an eye of an observer to enable observation of an image.

Observation optical systems used for the HMD and the like are desired to be compact. The observation optical systems are also desired to be capable of providing an image with a wide viewing angle to increase realistic sensation.

A large display element (image-forming element) is preferable to enable the observation optical system to provide an image with a wide viewing angle. However, it is difficult to always obtain display elements having a suitable display area size for required specifications on a display viewing angle of the observation optical system.

U.S. Pat. Nos. 5,982,343 and 6,008,778 and Japanese Patent Laid-Open No. 11-326820 have disclosed observation optical systems that achieve desired wide viewing angle display while using a display element having a smaller display area size compared to a desired display viewing angle. These optical systems enable observation of one image produced by combining plural original images that are displayed on plural display elements and correspond to different viewing fields.

The observation optical system disclosed in U.S. Pat. No. 5,982,343 is provided with a V-shaped mirror. The V-shaped mirror reflects at its one reflective surface light from an original image displayed on a display element toward a pupil and reflects at its other reflective surface light from another original image displayed on another display element toward the pupil.

The observation optical system disclosed in U.S. Pat. No. 6,008,778 is provided with a prism having a symmetric shape with respect to a section including the center of the viewing field for one image produced by combining two original images displayed on two display elements. This observation optical system uses two entrance surfaces of the prism each facing one display element as two reflective surfaces each reflecting light from the other display element.

The observation optical system disclosed in Japanese Patent Laid-Open No. 11-326820 is also provided with a prism having a symmetric shape with respect to a section including the center of the viewing field for one image produced by combining two original images displayed on two display elements. Light from one original image displayed on one display element enters the prism from an entrance surface facing the one display element, is totally reflected by a transmissive/totally reflective surface, is reflected by a reflective surface, and then is transmitted through the transmissive/totally reflective surface toward a pupil. Similarly, light from the other original image displayed on the other display element enters the prism from another entrance surface facing the other display element, is totally reflected by the transmissive/totally reflective surface, is reflected by another reflective surface, and then is transmitted through the transmissive/totally reflective surface toward the pupil.

The two reflective surfaces combining the light from the one original image and the light from the other original image and causing them to proceed toward the same pupil are disposed adjacent to each other.

Each of the observation optical systems disclosed in the above patent documents combines the light fluxes from the two display elements at the two reflective surfaces disposed adjacent to each other. Specifically, the light flux from one original image displayed on one display element is reflected by one reflective surface toward the pupil, and the light flux from the other original image displayed on the other display element is reflected by the other reflective surface adjacent to the one reflective surface toward the pupil.

In other words, when considering two optical paths toward the two display elements in backward ray tracing from the pupil, the optical path from the pupil is separated into two optical paths toward the two display elements by the two reflective surfaces disposed adjacent to each other.

These observation optical systems can provide a wider viewing angle than that normally obtained by using a display element having a small display area size. Moreover, they can provide a similar viewing angle to a conventional one by using a more compact optical system (optical system thin in a view axis direction).

However, these observation optical systems include a joint line between the two reflective surfaces that separate the optical path from the pupil into the optical paths toward the display elements in the backward ray tracing. The joint line portion may scatter light to cause flare or the like.

BRIEF SUMMARY OF THE INVENTION

The present invention provides an image observation apparatus that includes an observation optical system combining plural original images to enable observation of one combined image and that can suppress generation of light scattering, flare and the like.

The present invention according to an aspect provides an image observation apparatus including a first image-forming element and a second image-forming element each of which forms an original image, and an optical system configured to introduce light fluxes from the first and second image-forming elements to an exit pupil position of the optical system where an eye of an observer is placed. The optical system includes an optical surface as a single surface that reflects the light flux from the first image-forming element and transmits the light flux from the second image-forming element. The first image-forming element and the second image-forming element respectively form a first original image and a second original image that correspond to different viewing fields from the exit pupil position.

The present invention according to another aspect provides an image observation system including the image observation apparatus, and a driver that causes the first and second image-forming elements to form the first and second original images.

Other aspects of the present invention will be apparent from the embodiments described below with reference to the drawings.

DETAILED DESCRIPTION OF THE EMBODIMENTS

Exemplary embodiments of the present invention will be described below with reference to the accompanied drawings.

Embodiment 1

Figure 1:
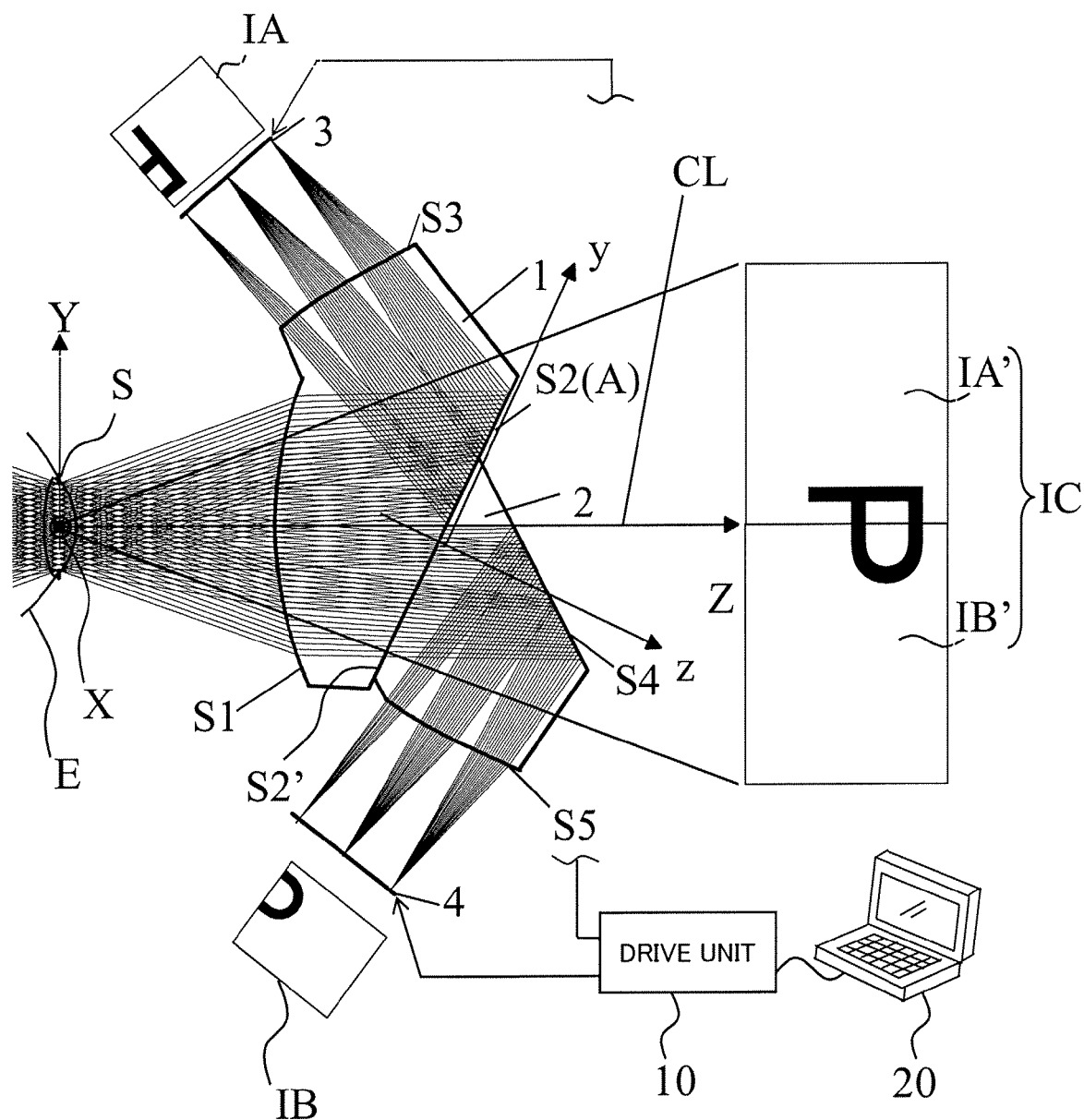
FIG. 1 is a horizontal sectional view showing the configuration of a display unit of an HMD that is a first embodiment (Embodiment 1) of the present invention.

FIG. 1 shows the horizontal sectional configuration of a display unit used for an HMD as an image observation apparatus that is a first embodiment (Embodiment 1) of the present invention.

Figure 18:
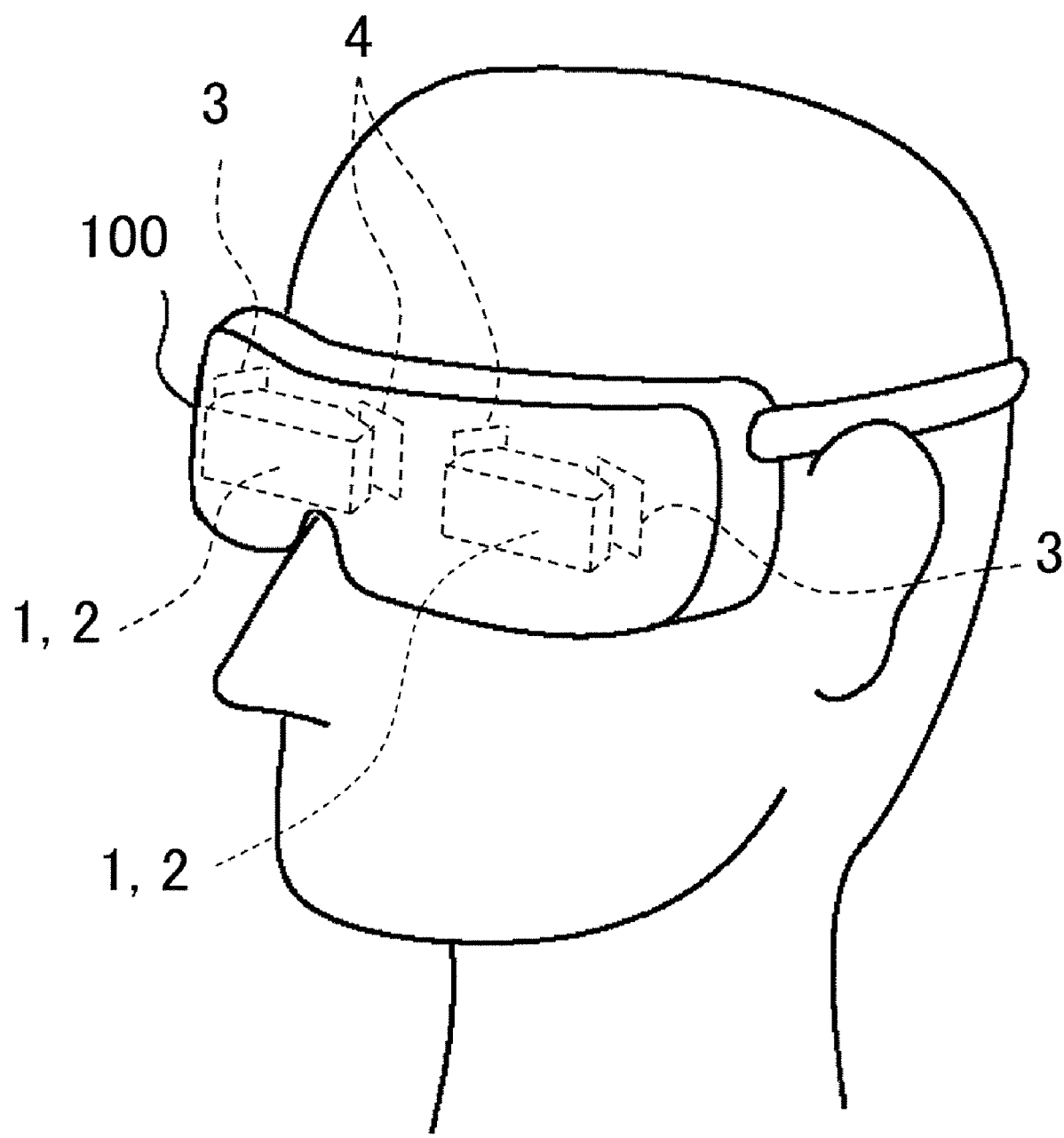
FIG. 18 shows the HMD of each of Embodiments 1 to 9.

As shown in FIG. 18, the HMD 100 of this embodiment is mounted on a head H of an observer and introduces image light to his/her eyes. However, FIG. 1 shows the display unit for introducing the image light to one eye. Providing the display unit showing in FIG. 1 for each of right and left eyes as shown in FIG. 18 can realize a binocular HMD. This is also applied to the embodiments described below. Providing only one display unit for introducing the image light to one eye can realize a monocular HMD.

In FIGS. 1 and 18, reference numeral 1 denotes a first optical element and 2 a second optical element. The first and second optical elements 1 and 2 constitute an observation optical system. Each of the first and second optical elements 1 and 2 is formed as a translucent member filled thereinside with a medium such as optical glass or optical resin.

Reference numeral 3 denotes a first display element and 4 a second display element. These first and second display elements 3 and 4 are image-forming elements constituted by liquid crystal panels or organic EL panels. The first and second optical elements 1 and 2 and the first and second display elements 3 and 4 constitute the display unit for one eye.

As shown in FIG. 1, the first and second display elements 3 and 4 are connected to a drive unit (driver) 10. An image supply apparatus 20 such as a personal computer, a DVD player, and a television tuner is connected to the drive unit 10. The drive unit 10 drives, based on image signals input from the image supply apparatus 20, the first and second display elements 3 and 4 such that they respectively display (form) original images. The HMD and the drive unit 10 constitute an image observation system.

The first display element 3 displays a first original image IA corresponding to a left-half of one image (single image) that is formed based on the image signal from the image supply apparatus 20. The second display element 4 displays a second original image IB corresponding to a right-half of the one image.

The first and second optical elements 1 and 2 introduce light fluxes (image light) from the first and second display elements 3 and 4 to a position or an area where an exit pupil S of the observation optical system is formed. The position or area where the exit pupil S is formed is hereinafter referred to as the exit pupil position. One eye E of the observer is placed at the exit pupil position. The observation optical system combines a first image IA' as an enlarged virtual image corresponding to the first original image IA and a second image IB' as an enlarged virtual image corresponding to the second original image IB to form a combined image IC as a single enlarged virtual image, the combined image IC being observed by the observer.

The exit pupil position can also be said as an observation position (or observation area) where the one eye E of the observer is placed to enable the observer to observe the combined image IC in the entire viewing field.

In the first optical system 1, reference symbol S2 denotes an optical path combining surface A as a single (or simple) surface, the surface S2 (A) being formed as a decentered surface. The optical path combining surface S2 is also formed as a half-mirror surface (half-transmissive reflective surface). The single (optical) surface means one (optical) surface continuously formed without a joint line.

The optical path combining surface S2 reflects the light flux from the first display element 3 toward the exit pupil S (that is, the exit pupil position) and transmits the light flux from the second display element 4 toward the exit pupil S.

When the exit pupil S is defined as an entrance pupil of the observation optical system and light rays are traced from the entrance pupil to the first and second display elements 3 and 4, that is, when the light rays are traced in backward ray tracing, the optical path combining surface S2 serves as a separating surface which causes part of an effective light flux from the entrance pupil to proceed toward the first display element 3 and causes the remaining part of the effective light flux to proceed toward the second display element 4.

The optical path combining surface S2 of the first optical element 1 and a surface S2' of the second optical element 2 have the same curvature radius. The first and second optical elements 1 and 2 are combined as follows. The surfaces S2 and S2' are disposed close to each other such that they can be regarded as the same surface. The surfaces S2 and S2' are cemented to each other by an adhesive. The adhesive has a refractive index identical or close to that of the material forming the first and second optical elements. The surfaces S2 and S2' separated from each other are hereinafter treated as one cemented surface.

In this embodiment, the term "identical (or same)" means not only to be completely identical but also to have a difference within a range that can be regarded as optically identical.

Next, description will be made of optical paths in the observation optical system and optical effects thereof.

The light flux from the first original image IA displayed on the first display element 3 enters the first optical element 1 from a surface S3, is reflected by the half-mirror surface S2, and then is transmitted through a surface S1 to emerge from the first optical element 1. Since the surface S1 has a positive refractive power, the light flux transmitting therethrough is refracted so as to be collected toward the exit pupil S to reach the exit pupil S. The observer placing the eye E at the exit pupil position recognizes an enlarged virtual image of the first original image IA formed by the refractive powers of the surfaces S3 and S1.

The light flux from the second original image IB displayed on the second display element 4 enters the second optical element 2 from a surface S5 and then is reflected by a surface S4 toward the cemented surface where the surface S2' of the second optical element 2 and the half-mirror surface S2 of the first optical element 1 are cemented with each other. Then, the light flux is transmitted through the surface (S2' and S2) to enter the first optical element 1.

The light flux that has entered the first optical element 1 from the second display element 4 is refracted so as to be collected toward the exit pupil S by the surface S1 and emerges from the first optical element 1 to reach the exit pupil S. The observer recognizes an enlarged virtual image of the second original image IB formed by the refractive powers of the surfaces S5 and S1.

Providing the surfaces S3, S5 and S1 each having a refractive power at positions rearward and forward of the surface S2 (S2') that is the optical path combining surface S2 enables optical power sharing between the surfaces, which can suppress generation of various aberrations.

An optical path of the light flux starting from the first display element 3, passing through the surface S3 that constitutes a first optical system part and then reaching the surface S2 is hereinafter referred to as a first optical path. An optical path of the light flux starting from the second display element 4, passing through the surfaces S5 and S4 that constitute a second optical system part and then reaching the surface S2 is hereinafter referred to as a second optical path. The first and second optical paths are integrated into a third optical path as one optical path by reflection and transmission at the surface S2. The third optical path passes through the surface S1 that constitutes a third optical system part common to the light fluxes from the first and second optical paths to reach the exit pupil S.

When an axis extending from the center of the exit pupil S to the center of the viewing field for observing the combined image IC is an axis of view CL, a Y-Z section is defined as a section in which the axis of view CL corresponds to a Z axis. An X axis is defined as an axis perpendicular to the sheet of the figure. The X axis, an Y axis and the Z axis are mutually orthogonal at the center of the exit pupil S. In this embodiment, a direction of the Y axis corresponds to a horizontal direction (a long side direction of the combined image), and a direction of the X axis corresponds to a vertical direction (a short side direction of the combined image).

A light ray identical to the axis of view CL (Z axis) is defined as a central-view-angle principal ray. A section including portions of the central-view-angle principal ray before and after being bent at the half-mirror surface S2 is defined as a y-z section. In this case, rotational decentering of the half-mirror surface S2 is expressed only by rotation around the X axis. That is, the y-z section in a local coordinate system of the decentered surface S2 is identical to the Y-Z section in a global coordinate system of the entire observation optical system. The Y-Z section is a decentering tilt section of the decentered surface S2.

In this embodiment, the first and second images IA' and IB' are combined to be displayed on the decentering tilt section of the decentered surface S2. That is, the observation optical system combines light fluxes from "plural (first and second) original images corresponding to different viewing fields" to form one combined image corresponding to one combined viewing field.

As shown in FIG. 1, viewing fields in a +Y direction and a −Y direction in the Y-Z section form a combined viewing field for observing the combined image IC of the first and second images IA' and IB' corresponding to the first and second original images IA and IB displayed on the first and second display elements 3 and 4.

As described above, this embodiment forms two viewing fields shifted in the Y axis direction on the Y-Z section and enables the observation of the combined image IC of the first and second images IA' and IB' through the combined viewing field of the two viewing fields. This can miniaturize the first and second display elements 3 and 4 and can achieve an observation optical system capable of wide viewing angle display while reducing the sizes of the respective optical surfaces of the first and second optical elements 1 and 2. In other words, this embodiment can achieve a compact HMD capable of wide viewing angle display.

Figure 2:
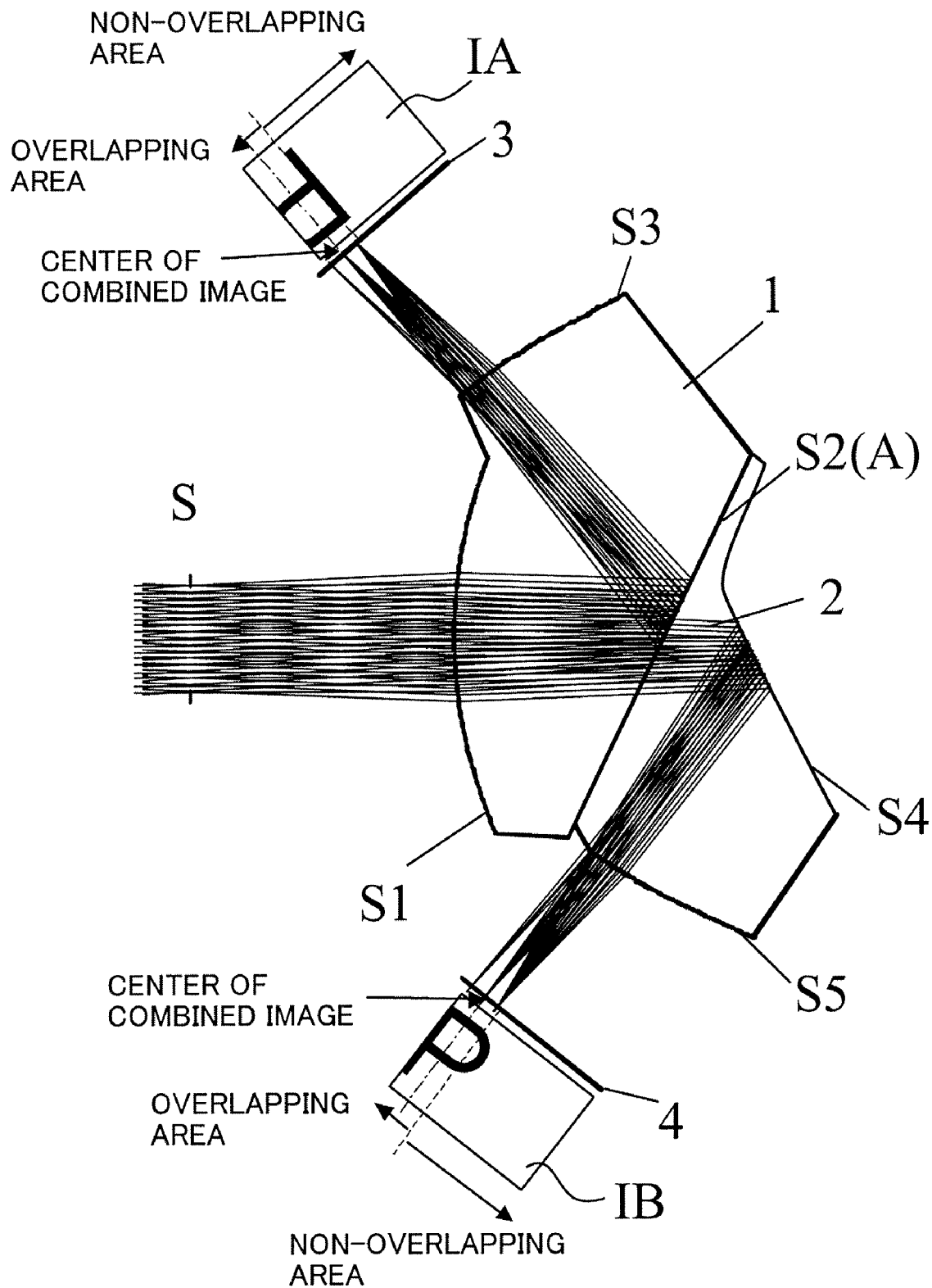
FIG. 2 is a horizontal sectional view for explaining overlap display of original images in Embodiment 1.

FIG. 2 shows a case where the combined image based on the first and second original images IA and IB that partially overlap each other is displayed by an observation optical system having the configuration similar to that of the observation optical system shown in FIG. 1. Although FIG. 1 shows the case where the combined image is displayed without overlapping the first and second original images IA and IB, the first and second original images IA and IB may partially overlap each other as shown in FIG. 2. The above-described term "plural (first and second) original images corresponding to different viewing fields" includes such plural original images partially overlapping each other.

Figure 3A:
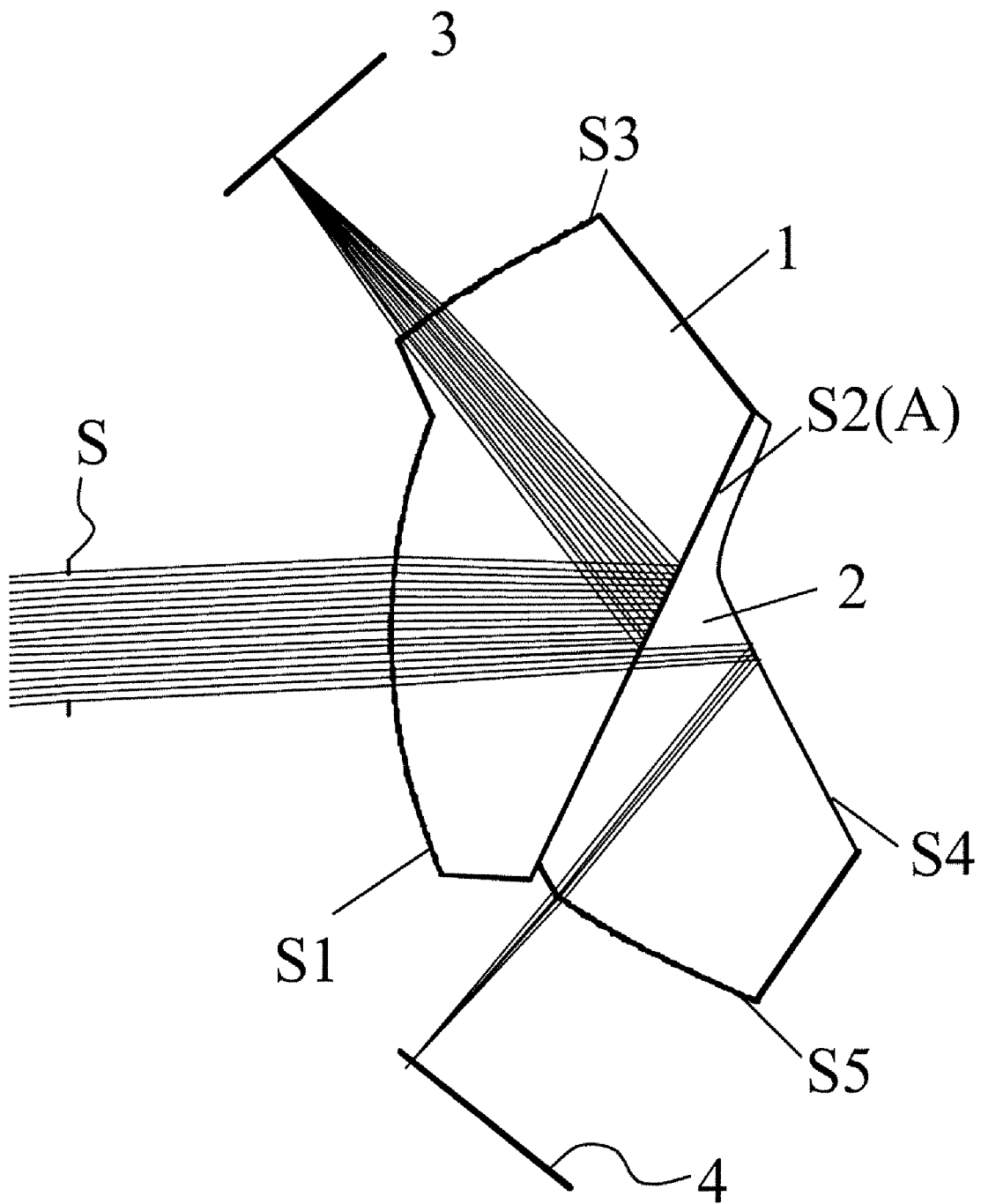
FIGS. 3A to 3C are horizontal sectional views for explaining states of an exit pupil in the overlap display in Embodiment 1.
Figure 3B:
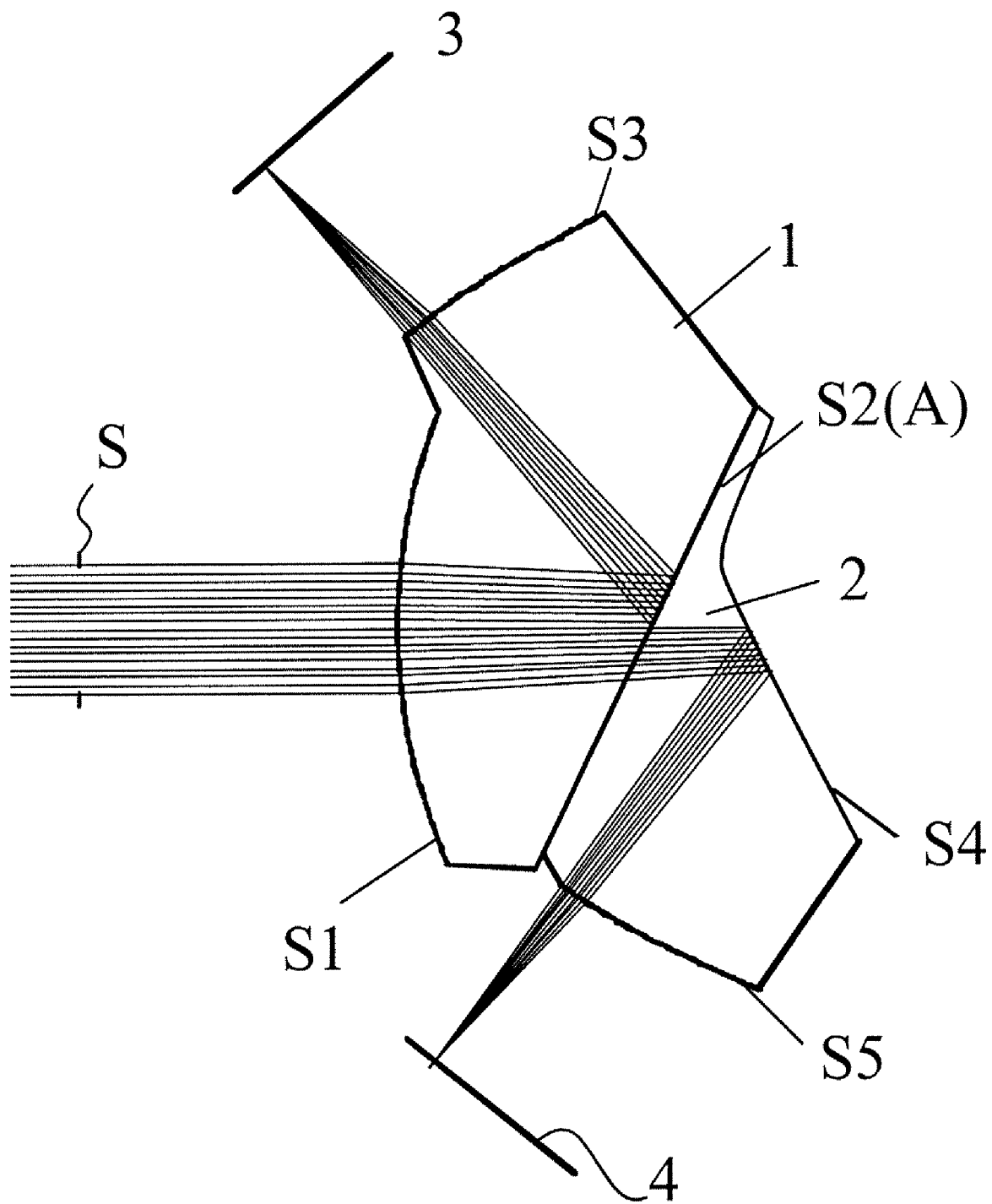
Figure 3C:
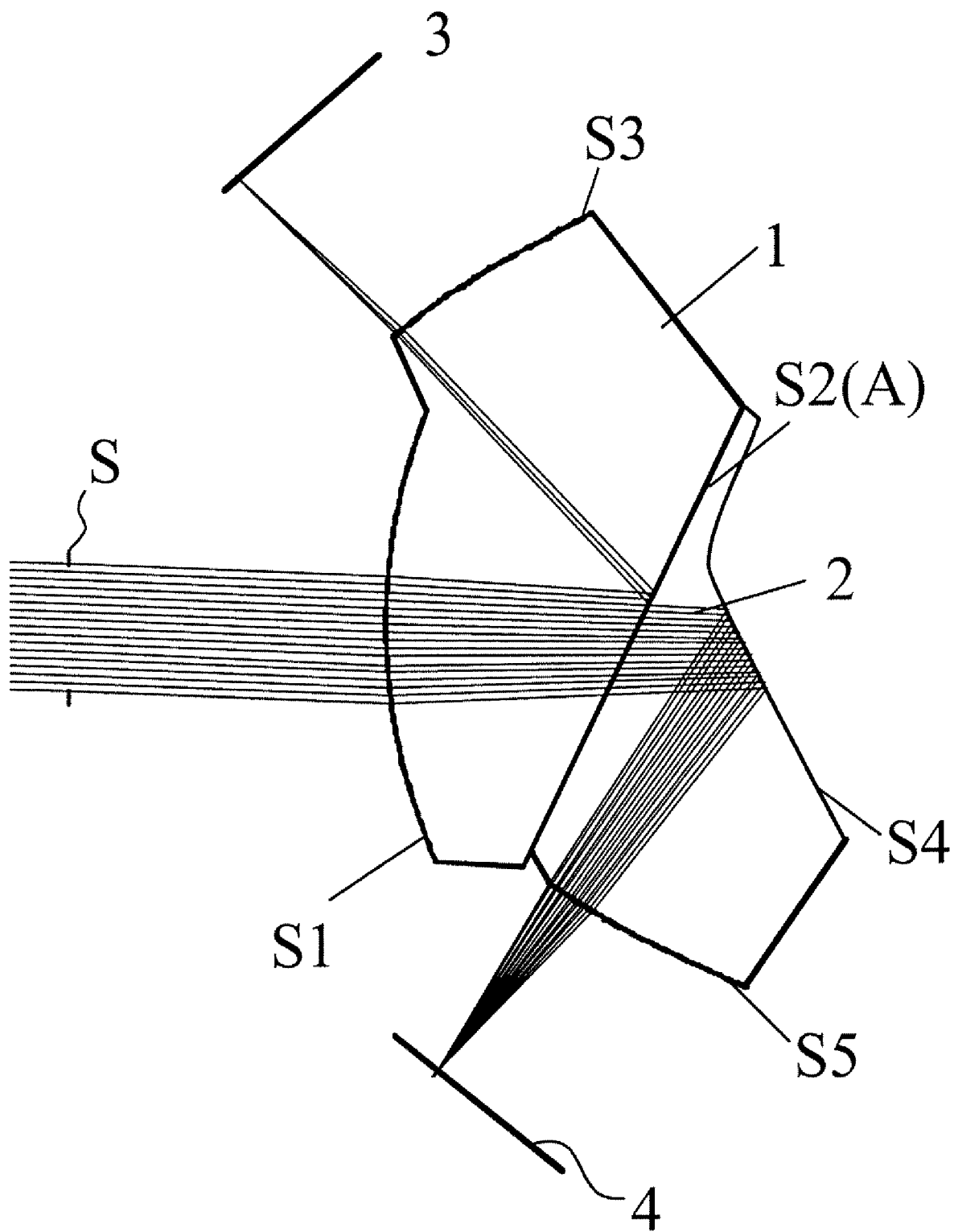

FIGS. 3A to 3C show an example of division of the exit pupil S in the case where plural original images partially overlap each other. FIG. 3A shows light flux forming a viewing angle slightly shifted from the central viewing angle. FIG. 3B shows light flux forming the central viewing angle. FIG. 3C shows light flux forming a viewing angle slightly shifted from the central viewing angle in a direction opposite to the shift direction in FIG. 3A.

In these figures, the light flux on the left side from the exit pupil S (upper side in the figures: hereinafter referred to as the upper side) is the light flux from the first display element 3. The light flux on the right side from the exit pupil S (lower side in the figures: hereinafter referred to as the lower side) is the light flux from the second display element 4.

In the viewing angle shown in FIG. 3A, the light flux from the first display element 3 reaches an area in the exit pupil S extending from the upper end of the exit pupil S to a position on the lower side than the center of the exit pupil S (hereinafter referred to as the pupil center). The light flux from the second display element 4 reaches another area in the exit pupil S where the light flux from the first display element 3 does not reach.

In the vicinity of the center of the viewing angle of the combined image shown in FIG. 3B, the light flux from the first display element 3 reaches an area in the exit pupil S including the pupil center and an upper area therethan. The light flux from the second display element 4 reaches another area in the exit pupil S including the pupil center and a lower area therethan.

In the viewing angle shown in FIG. 3C, the light flux from the second display element 4 reaches an area in the exit pupil S extending from the lower end of the exit pupil S to a position on the upper side than the pupil center. The light flux from the first display element 3 reaches another area in the exit pupil S where the light flux from the second display element 4 does not reach.

In this display unit, the first and second original images IA and IB displayed on the first and second display elements 3 and 4 include a partially overlapped area. However, the observation optical system complementarily forms the exit pupil S with the light fluxes from the first and second original images IA and IB by changing the proportion of the areas respectively formed with those light fluxes in the exit pupil S according to the viewing angle such that a lack or an overlap of the light fluxes is not generated at the exit pupil S. Specifically, effective areas of the surfaces S3 and S5 are respectively set so that such an exit pupil S can be formed.

Figure 17:
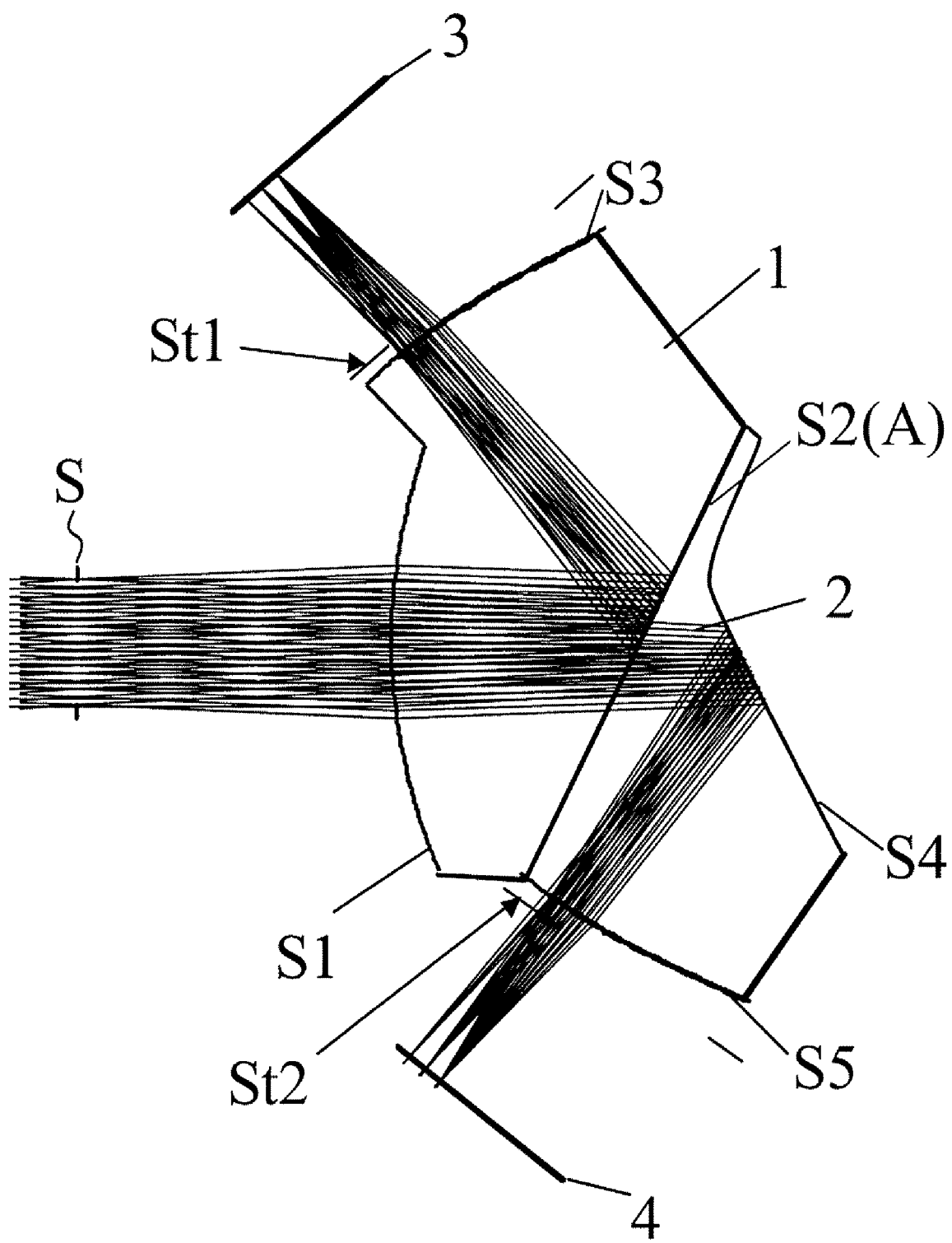
FIG. 17 is a horizontal sectional view showing a modified example of Embodiment 1.

In FIG. 17, an observation optical system is shown in which an aperture stop St1 is disposed between the surface S3 and the first display element 3 and an aperture stop St2 is disposed between the surface S5 and the second display element 4. The aperture stops St1 and St2 change the proportion of the areas respectively formed with the light fluxes from the first and second display elements 3 and 4 in the exit pupil S according to the viewing angle such that a lack or an overlap of the light fluxes is not generated at the exit pupil S, thereby making it possible to complementarily form the exit pupil S.

Complementarily forming the exit pupil S as described above can mostly eliminate a change of the amount of light entering the pupil of the observer's eye in motion, thereby enabling the observer to observe the combined image having a substantially constant brightness.

The above description was made of the case of displaying the combined image combined in the horizontal direction. However, a combined image combined in the vertical direction may be displayed as shown in FIG. 4.

Figure 4:
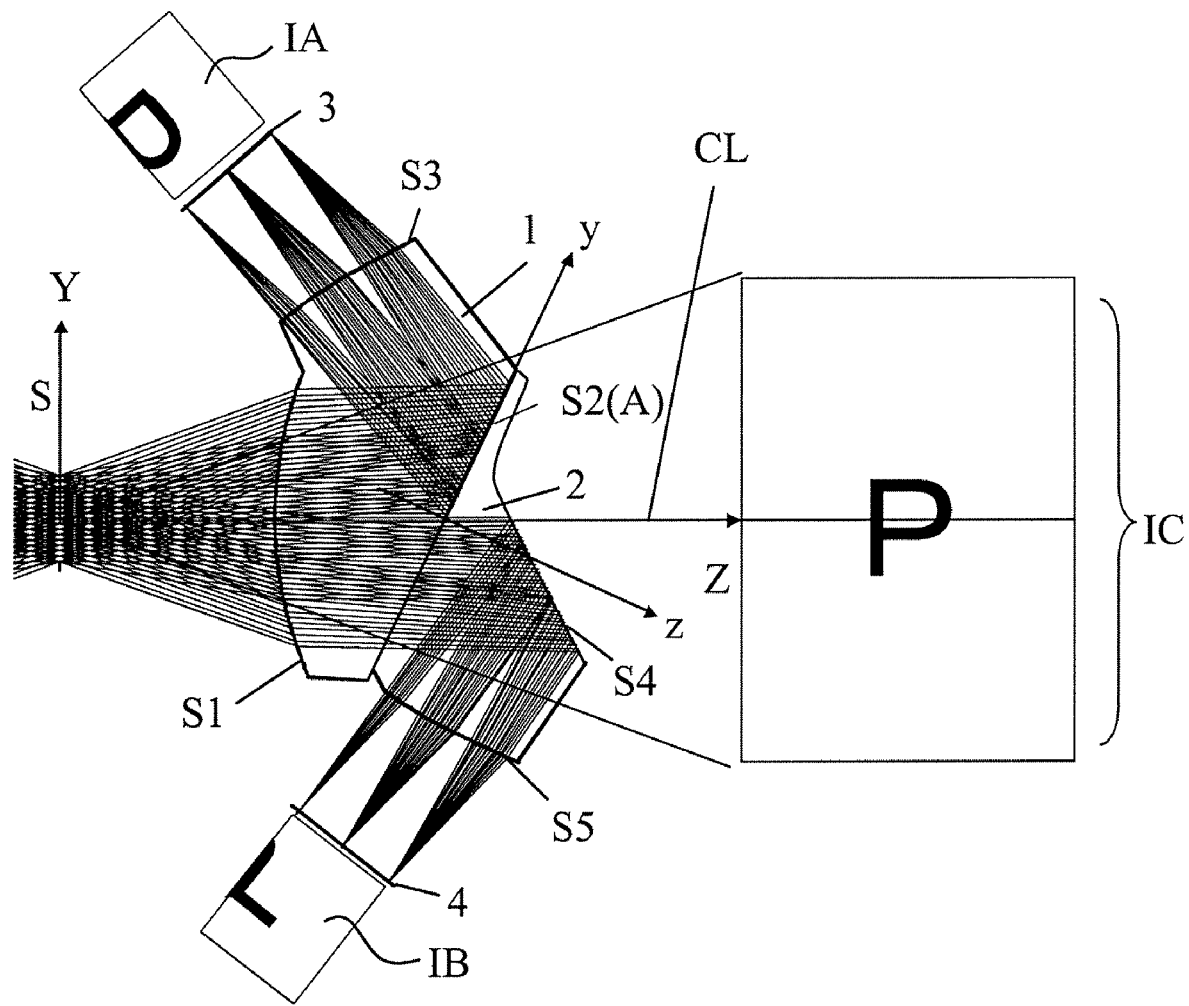
FIG. 4 is a vertical sectional view for explaining a case where the original images are combined in a vertical direction.

FIG. 4 shows a vertical section of an observation optical system displaying the combined image combined in the vertical direction, the Y axis direction corresponding to the vertical direction. The first and second display elements 3 and 4 are disposed in the vertical direction with respect to the observation optical system (first and second optical elements 1 and 2). This configuration combines the light fluxes from the first and second original images IA and IB corresponding to different viewing fields in the vertical direction to provide one combined image IC corresponding to one combined viewing field. Although the first and second optical paths are adjacent to each other at the surface S2 in this configuration, the first and second optical paths may partially overlap each other.

As described above, the observation optical system in which the viewing field is divided (in other words, the original images are combined) in the horizontal direction and the observation optical system in which the viewing field is divided in the vertical direction are included in embodiments of the present invention.

According to this embodiment, since the entire decentered surface that is the optical path combining surface A (S2) is formed as a half-mirror surface, a joint line caused by the combination of the optical paths, that is, the combination of the images can be eliminated. Thus, generation of unnecessary scattering light, flare or the like can be suppressed.

Embodiment 2

Figure 5:
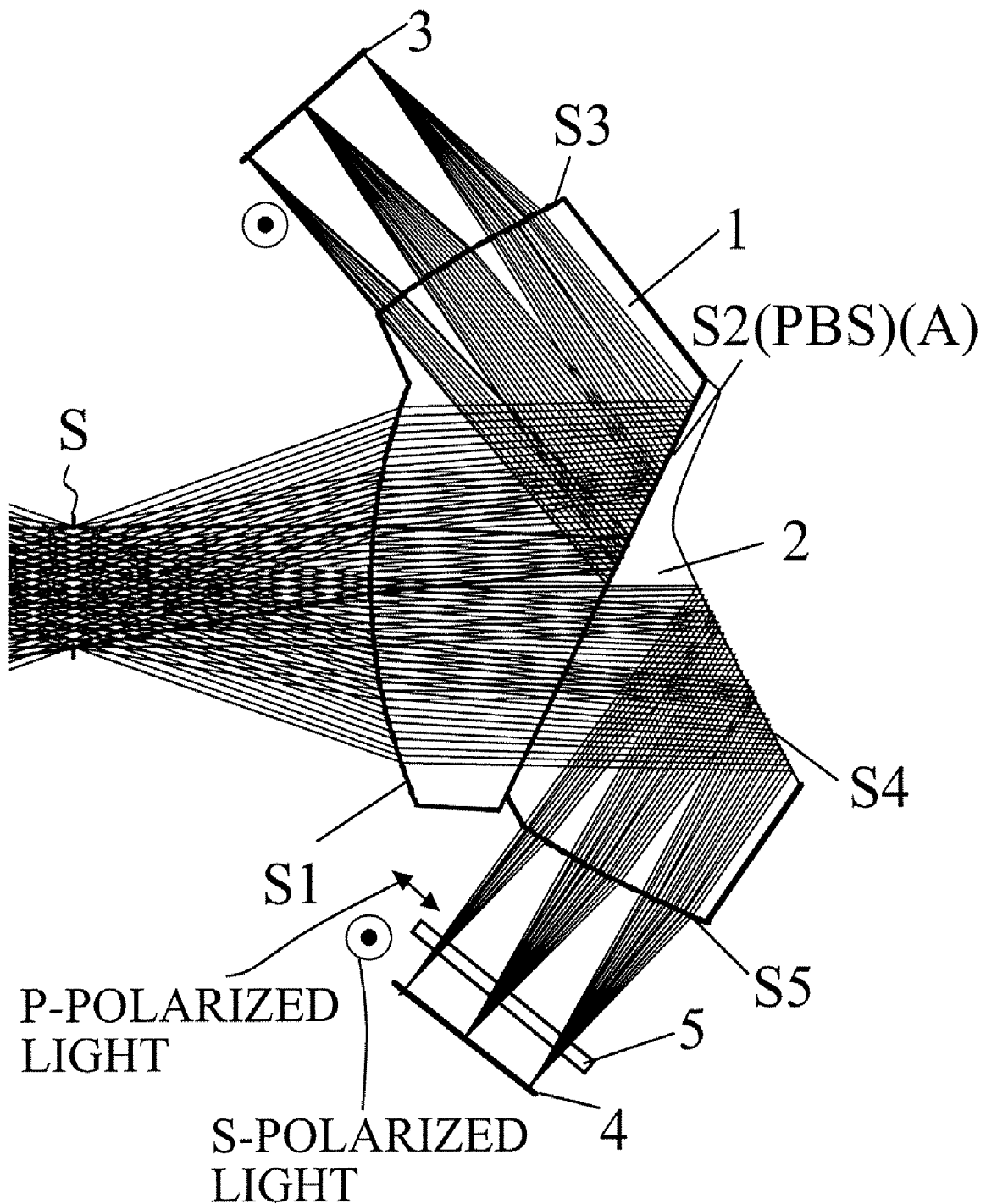
FIG. 5 is a horizontal sectional view showing the configuration of a display unit of an HMD that is a second embodiment (Embodiment 2) of the present invention.

FIG. 5 shows the horizontal sectional configuration of a display unit used for an HMD that is a second embodiment (Embodiment 2) of the present invention.

Constituent elements in this embodiment identical or having identical functions to those in Embodiment 1 are denoted by the same reference numerals or symbols as those in Embodiment 1. This is also applied to other embodiments described later. Although FIG. 5 does not show the X, Y and Z axes, the section shown in this figure corresponds to the Y-Z section shown in FIG. 1. This is also applied to the other embodiments described later unless otherwise described.

In this embodiment, an optical path combining surface A (S2) that is a single optical surface of a first optical element 1 is formed by a polarization splitting surface. The polarization splitting surface S2 reflects a light flux having a first polarization direction (S-polarized light in this embodiment) and transmits a light flux having a second polarization direction (P-polarized light in this embodiment) different from the first polarization direction. The polarization splitting surface S2 is formed by depositing a multilayer film on an outer surface of the first optical element 1, for example. In this embodiment, the first and second optical paths described in Embodiment 1 are adjacent to each other at the polarization splitting surface S2.

Further, in this embodiment, a λ/2 plate (half-wave plate) 5 is disposed between a second display element 4 and a surface S5 of a second optical element 2. When S-polarized light is emerged from both the first and second display elements 3 and 4, the λ/2 plate 5 converts the S-polarized light from the second display element 4 into P-polarized light.

S-polarized light from the first display element 3 enters the first optical element 1 from a surface S3, is reflected by the polarization splitting surface S2, and then is transmitted through a surface S1 to emerge from the first optical element 1 to reach an exit pupil S. Light, which is converted into P-polarized light by the λ/2 plate 5 after emerging from the second display element 4 as S-polarized light, enters the second optical element 2 from the surface S5, is reflected by a surface S4, and then is transmitted through the polarization splitting surface S2 to enter the first optical element 1. The P-polarized light that has entered the first optical element 1 emerges therefrom through the surface S1 to reach the exit pupil S.

As in Embodiment 1, an observer placing his/her eye E at the exit pupil position recognizes an enlarged virtual image of the first original image displayed on the first display element 3, the enlarged virtual image being formed by the refractive powers of the surfaces S3 and S1. The observer also recognizes through the eye E an enlarged virtual image of the second original image displayed on the second display element 4, the enlarged virtual image being formed by the refractive powers of the surfaces S5 and S1.

This embodiment can increase light use efficiency to provide a bright image in a case of employing display elements such as liquid crystal panels using polarized light.

The first and second display elements 3 and 4 may cause light fluxes having polarization directions orthogonal to each other to emerge therefrom. In this case, the λ/2 plate 5 can be removed.

Embodiment 3

Figure 6A:
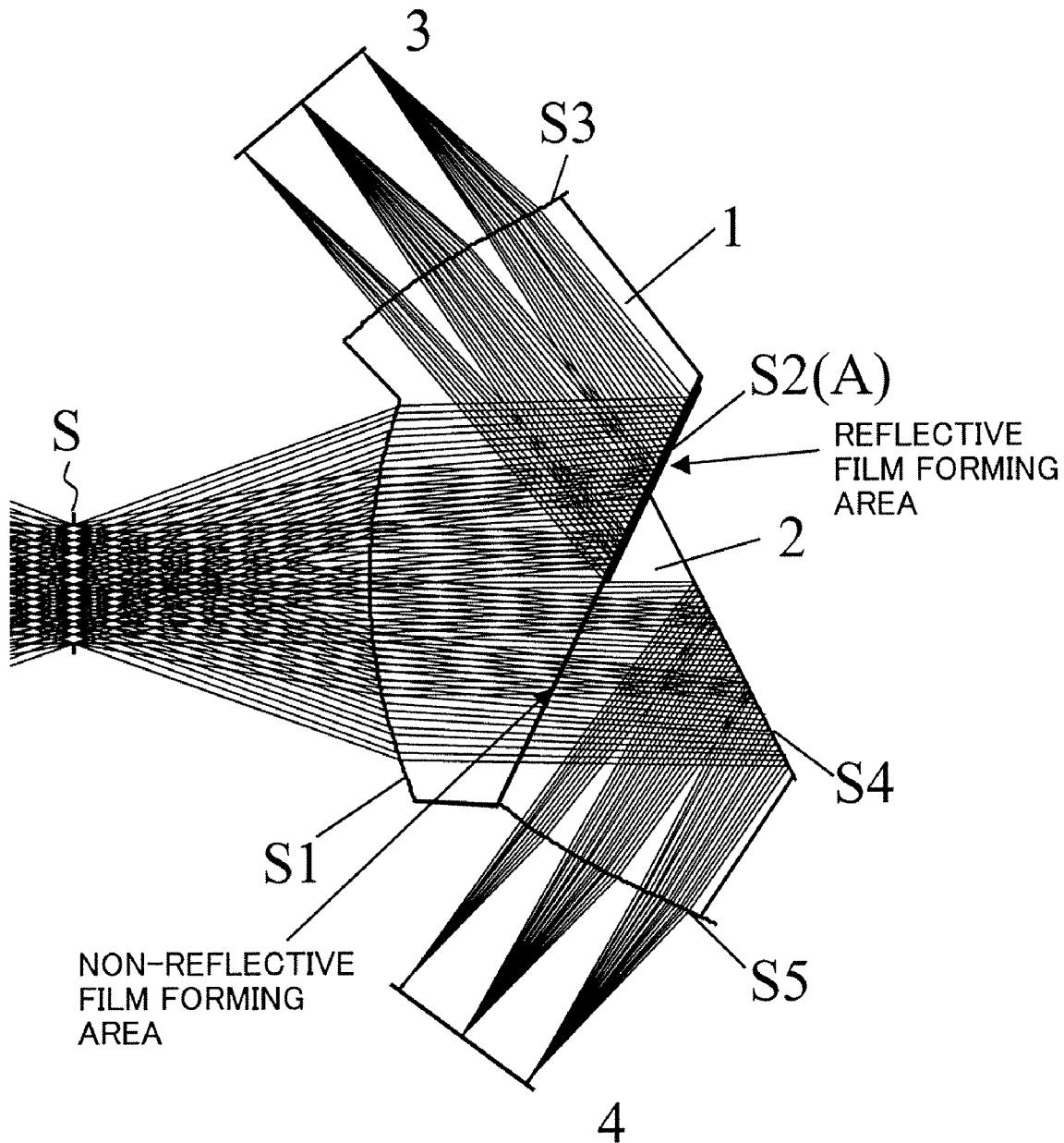
FIG. 6A is a horizontal sectional view showing the configuration of a display unit of an HMD that is a third embodiment (Embodiment 3) of the present invention.

FIG. 6A shows the horizontal sectional configuration of a display unit used for an HMD that is a third embodiment (Embodiment 3) of the present invention.

In this embodiment, a reflective film is formed on a partial area (reflective film forming area) of an optical path combining surface S2. Light flux from a first display element 3 is reflected by the reflective film forming area to be introduced to an exit pupil S. Another partial area (non-reflective film forming area) of the optical path combining surface S2 is an area where the reflective film is not formed thereon. Light flux from a second display element 4 is transmitted through the non-reflective film forming area to be introduced to the exit pupil S. The optical paths on which the light fluxes from the first and second display elements 3 and 4 proceed are the same as those in Embodiment 1. In this embodiment, the first and second optical paths described in Embodiment 1 are adjacent to each other at the surface S2.

Also in this embodiment, as described in Embodiment 1, the display unit may cause the first and second display elements 3 and 4 to display the first and second original images such that they partially overlap each other and cause the observation optical system to complementarily form the exit pupil S with the light flux from the first display element 3 reflected by the optical path combining surface A (S2) and the light flux from the second display element 4 transmitted therethrough.

In this case, the reflective film forming area and the non-reflective film forming area are desired to be formed on the same surface. That is, when the surface S2 has an optical power like a curved surface or a diffractive optical surface, the optical power is desired to be gently changed in the vicinity of the boundary between the reflective film forming area and the non-reflective film forming area. If the reflective film forming area and the non-reflective film forming area are formed on discontinuous surfaces having different optical powers for example, the complementary formation of the exit pupil is difficult, which easily causes problems such as generation of an area where the light flux from the display element does not reach.

Figure 6B:
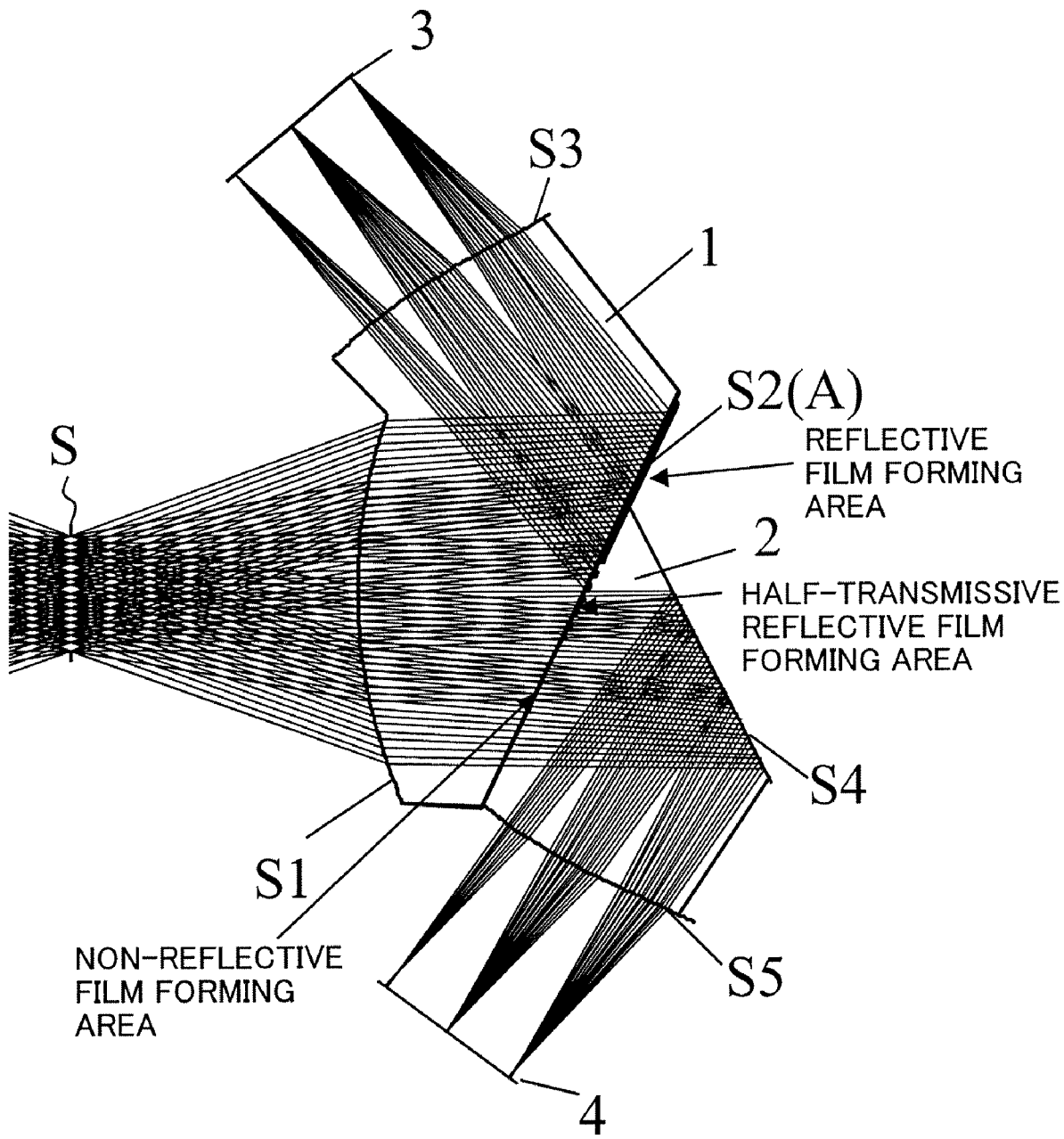
FIG. 6B is a horizontal sectional view showing a modified example of Embodiment 3.

Further, as shown in FIG. 6B, a configuration may be employed in which a half-transmissive reflective area is formed between the reflective film forming area and the non-reflective film forming area to gradually change the reflectance of the surface S2 between the reflective film forming area and the non-reflective film forming area. This can more effectively suppress scattering of light that may be slightly generated at the boundary between the reflective film forming area and the non-reflective film forming area.

This embodiment can achieve a lower-cost observation optical system than that of Embodiment 2 and can provide a brighter image than that in Embodiment 1.

Embodiment 4

Next, description will be made of the configuration of an HMD (or a display unit) that is a fourth embodiment (Embodiment 4) of the present invention. In this embodiment, a light flux from a display element is internally totally reflected by an optical path combining surface described below and a light flux from another display element is transmitted through the optical path combining surface. This is also applied to Embodiment 5 described later.

First, FIGS. 7 and 8A to 8E show an example of forming an exit pupil in a dividing manner using the same original image in order to explain the basic principle of this embodiment (and Embodiment 5).

Figure 7:
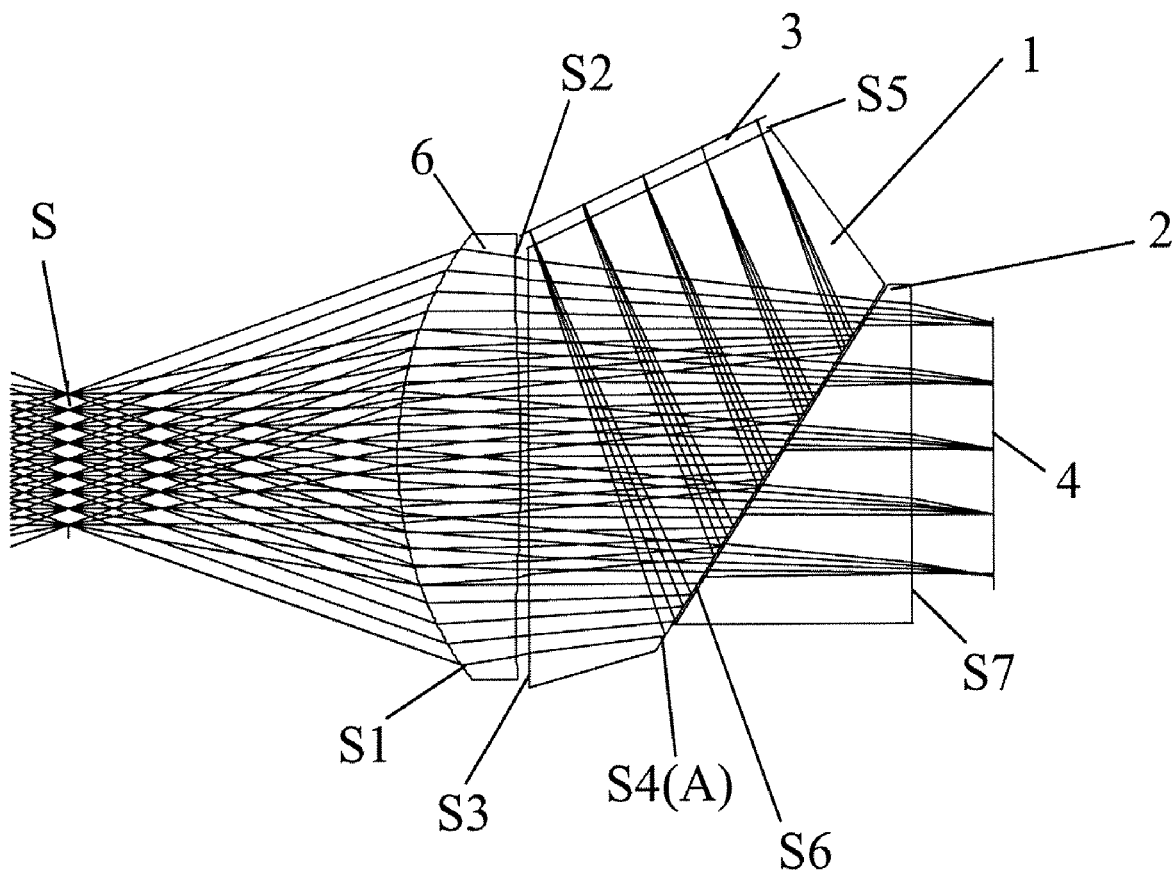
FIG. 7 is a horizontal sectional view showing the configuration of a display unit of an HMD that is a fourth embodiment (Embodiment 4) of the present invention.

FIG. 7 shows the configuration of the HMD of this embodiment. FIGS. 8A to 8E separately show optical paths from each of the display elements in this embodiment.

Reference numeral 6 denotes a lens disposed between a surface S3 of a first optical element 1 and an exit pupil S. The lens 6 is provided to form an optical system telecentric toward the display element that is an image plane in the backward ray tracing from the exit pupil S. In the backward ray tracing, principal rays of respective viewing angles passing through the center of an entrance pupil (exit pupil S) and forming images at different image height positions on first and second display elements 3 and 4 emerge in parallel to each other from a surface S2 of the lens 6. The term "parallel" includes a state where the principal rays are not completely parallel within a range that can be regarded as optically parallel.

The first optical element 1 and a second optical element 2 have optical surfaces each formed as a planar surface. The optical path combining surface (optical path separating surface in the backward ray tracing) A (S4) as a single optical surface of the first optical element 1 is disposed so as to form with the principal ray of each viewing angle in the backward ray tracing an angle slightly smaller than a critical angle of the optical path combining surface S4. The optical path combining surface S4 of the first optical element 1 and a surface S6 of the second optical element 2 are disposed in parallel with and facing each other with a minute distance (air space) therebetween.

The optical paths will hereinafter be described in the backward ray tracing. As shown in FIG. 8B, the principal rays of the respective viewing angles from an upper area of the entrance pupil (left side area in the horizontal direction in an actual HMD) enter the first optical element 1 from the surface S3 in parallel to each other, is transmitted through the surface S4, and then enters the second optical element 2 from the surface S6.

Then, the principal rays emerge from the second optical element 2 through a surface S7 to reach the second display element 4. Light rays emerging from positions in the entrance pupil other than the center thereof and forming images at the respective image height positions are collected by an image-forming effect of the lens 6 to proceed toward the surface S4. Therefore, as shown in FIG. 8B, the entire light rays from the upper area of the entrance pupil reach the surface S4 with an incident angle smaller than that of the principal rays to be transmitted therethrough.

Figure 8A:
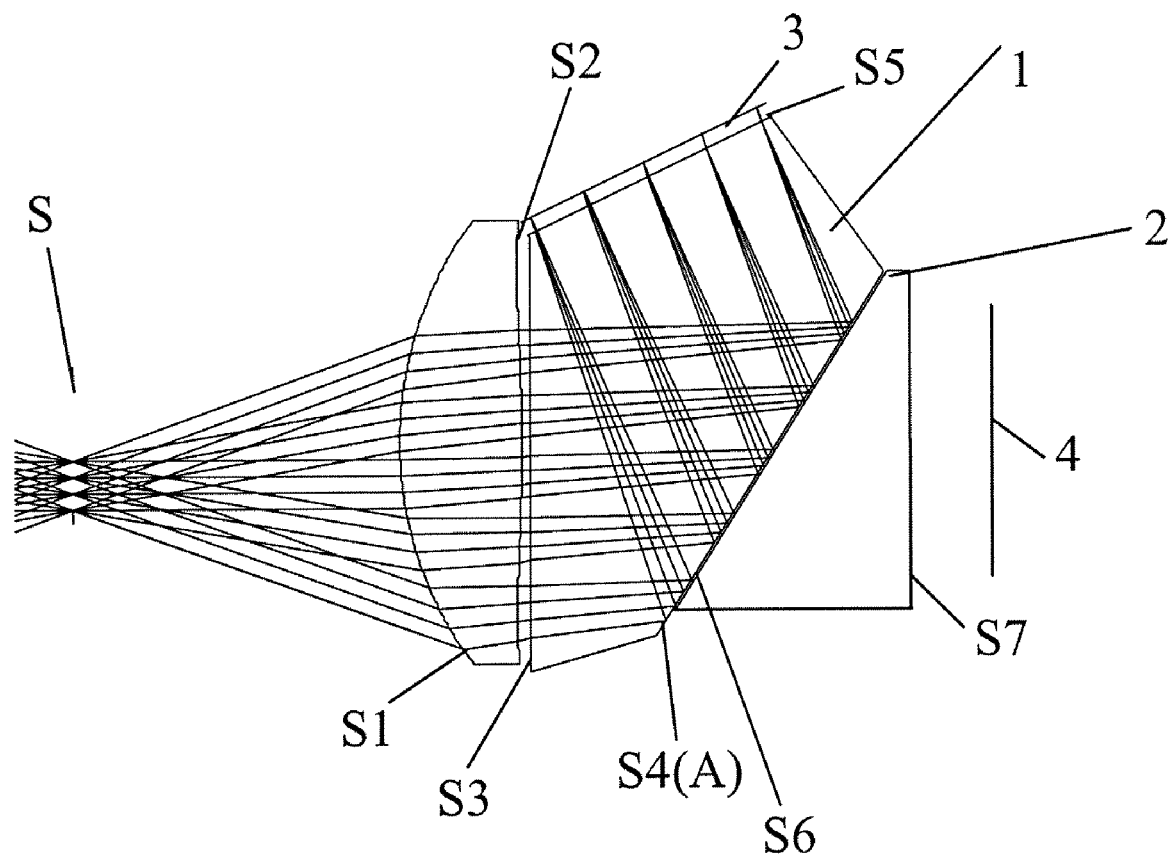
FIGS. 8A to 8E show optical paths from display elements in Embodiment 4.
Figure 8B:
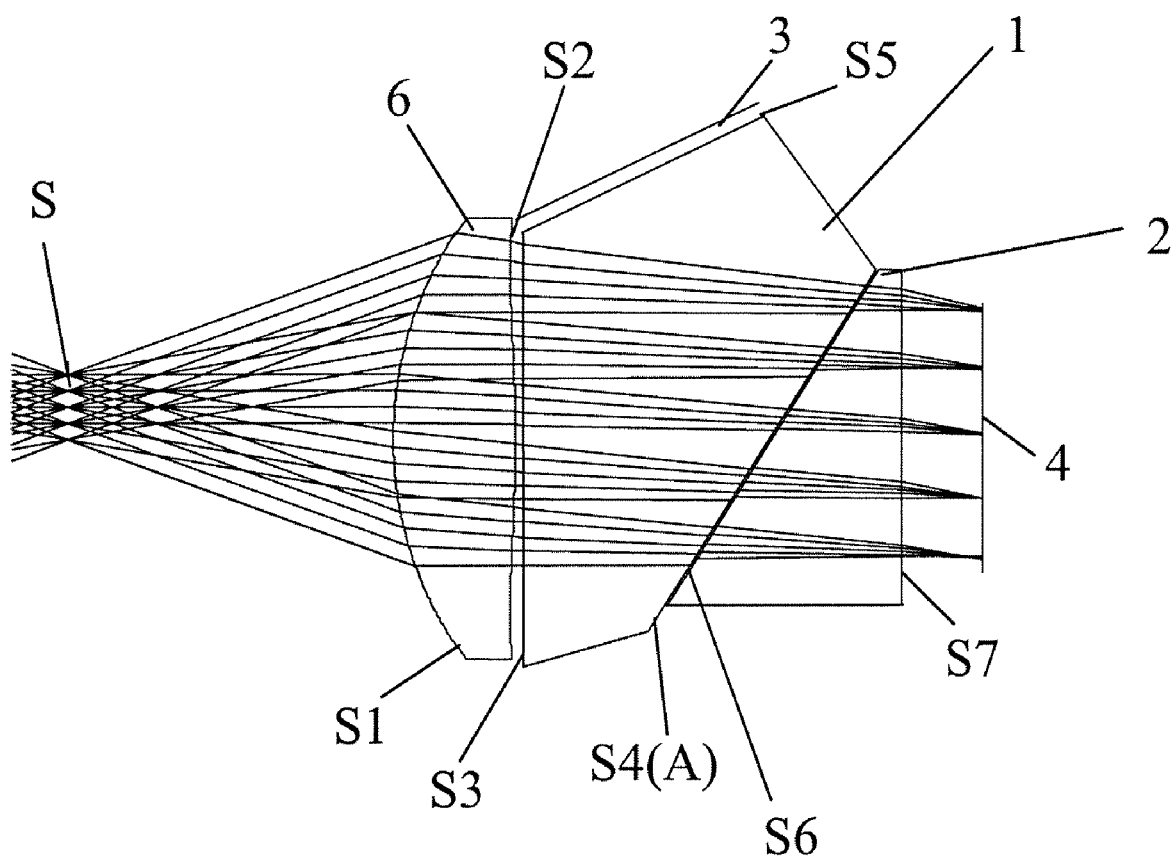

On the other hand, as shown in FIG. 8A, light rays from a lower area of the entrance pupil (right side area in the horizontal direction in the actual HMD) reach the surface S4 with an incident angle larger than that of the principal rays, incident angle which is larger than the critical angle. Therefore, the light rays are internally totally reflected by the surface S4 and then emerge from the first optical element 1 through the surface S5 to reach the first display element 3.

In a forward ray tracing showing the actual proceeding of light rays, only the light flux from the second display element 4 reaches the upper area of the exit pupil S, and only the light flux from the first display element 3 reaches the lower area of the exit pupil S.

Figure 8C:
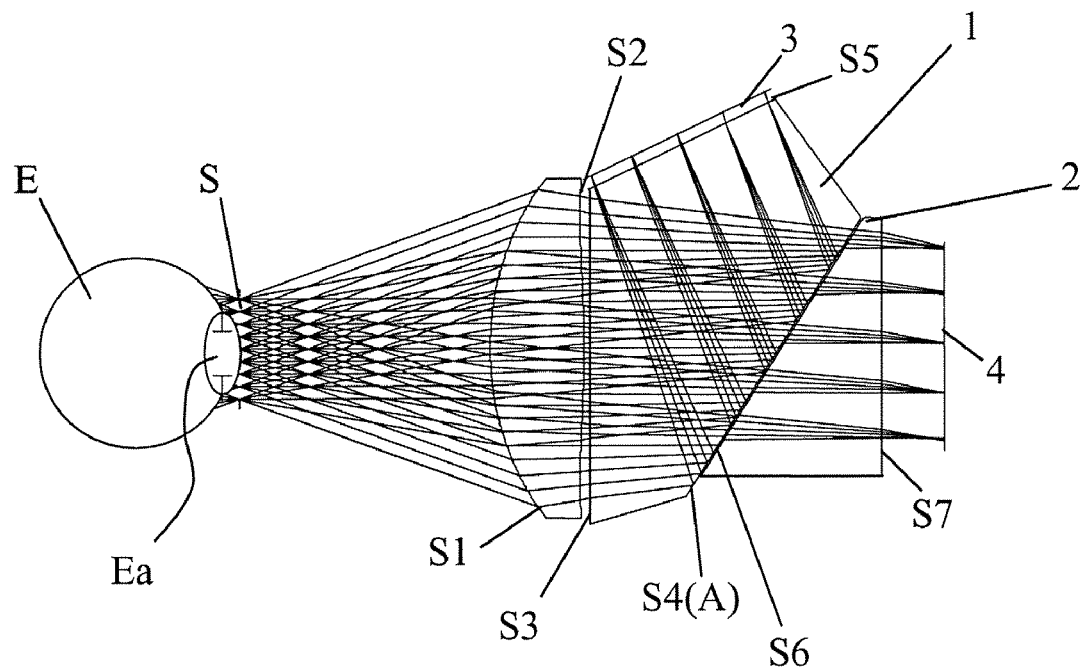
Figure 8D:
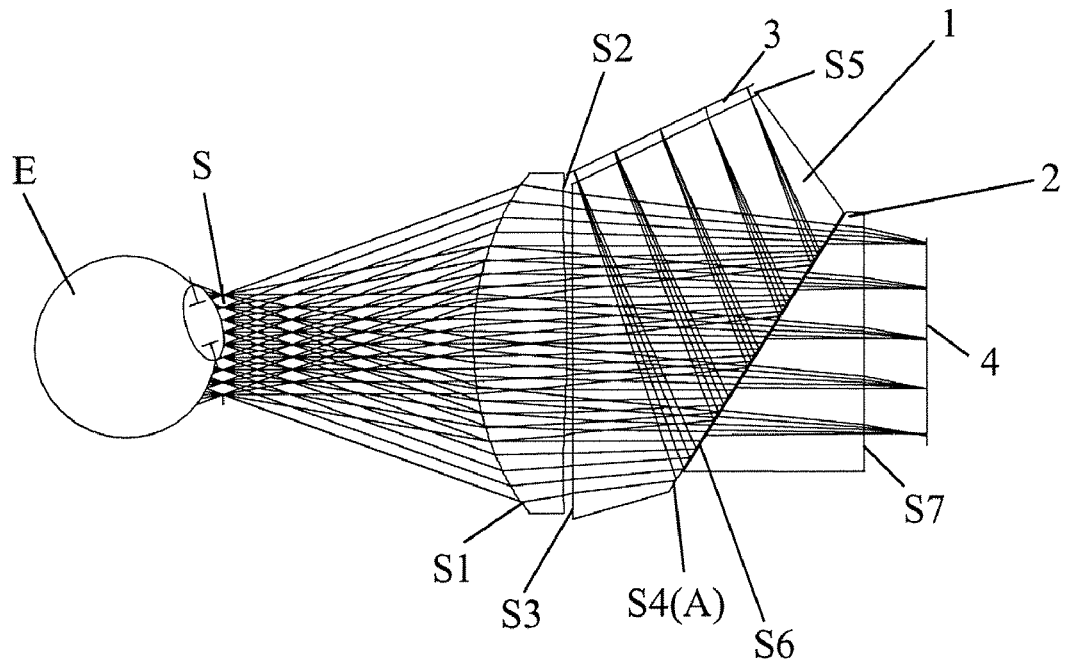
Figure 8E:
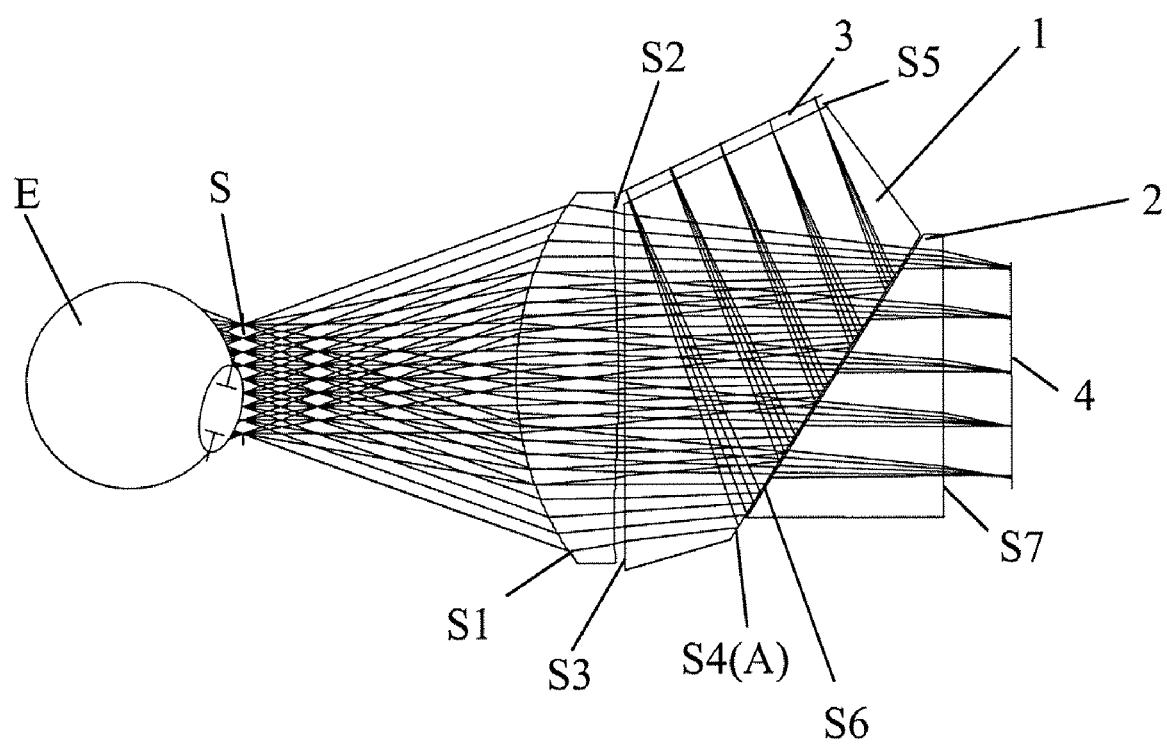

Therefore, the observer placing the eye E at the exit pupil position can always observe the enlarged combined image of the first and second original images. That is, the observer can observe the combined image with the light fluxes from the first and second display elements 3 and 4 not only when a pupil Ea of the eye E is located at the vicinity of the center of the exit pupil S as shown in FIG. 8C, but also when the pupil Ea is located in the upper and lower areas of the exit pupil S as shown FIGS. 8D and 8E.

A light ray impinging on the surface S4 at an incident angle slightly smaller than the critical angle in the backward ray tracing is shifted when the light ray proceeds from the surface S4 to the surface S6. A condition is assumed in which the focal length of the lens 6 is 20 mm, the air space between the surfaces S4 and S6 is 0.1 mm, the refractive index of the medium forming the first optical element 1 is 2, and only light rays emerging form the surface S4 at an angle within 80° with respect to the normal to the surface S4 are introduced to the second display element 4. Under this condition, each of these light rays is shifted between the surfaces S4 and S6 by about 1 mm in a direction parallel to the surfaces S4 and S6.

In this case, an area in the entrance pupil from which light rays (hereinafter referred to as non-reaching rays) in the backward ray tracing do not reach either of the first and second display elements 3 and 4 has a width smaller than 0.5 mm. Such a minute area does not cause a problem since the observer is not concerned about a light amount change due to the minute area.

Therefore, it is desirable that the air space between the surfaces S4 and S6 be smaller and the refractive index of the medium forming each optical element be higher. The pupil diameter of an observer observing an image of several dozen cd/m2 is actually about 3 to 4 mm, so that the above-described area of the non-reaching rays having a width of about 1 mm does not cause any problem. Consequently, it is desirable to set the air space between the surfaces S4 and S6 to 0.2 mm or smaller and to set the refractive index of the medium forming each optical element to 1.5 or higher.

Further, it is desirable to provide for the second display element 4 the function of limiting the emergence angle of the light flux therefrom, for example. The function of limiting the emergence angle is realized by using a light-shielding member that limits spread of the light flux, a light source in which the emergence angle of emitting light is limited, or the like.

Even in the case where the observation optical system is configured not to use part of the light rays as described above, only an area (non-ray reaching area) where no light rays reach having a small width is generated between the upper area of the exit pupil S where the light rays reach from the second display element 4 and the lower area of the exit pupil S where the light rays reach from the first display element 3. Thus, there is no problem for image observation.

This embodiment including the internal total reflection of the light flux from one of the display elements eliminates a reflective film formed in Embodiments 1 to 3, which can reduce the cost of the observation optical system. Further, this embodiment eliminates absorption of light at the reflective film, which can provide a brighter image even with the same amount of light from the display elements as that in Embodiments 1 to 3.

Embodiment 5

Figure 9:
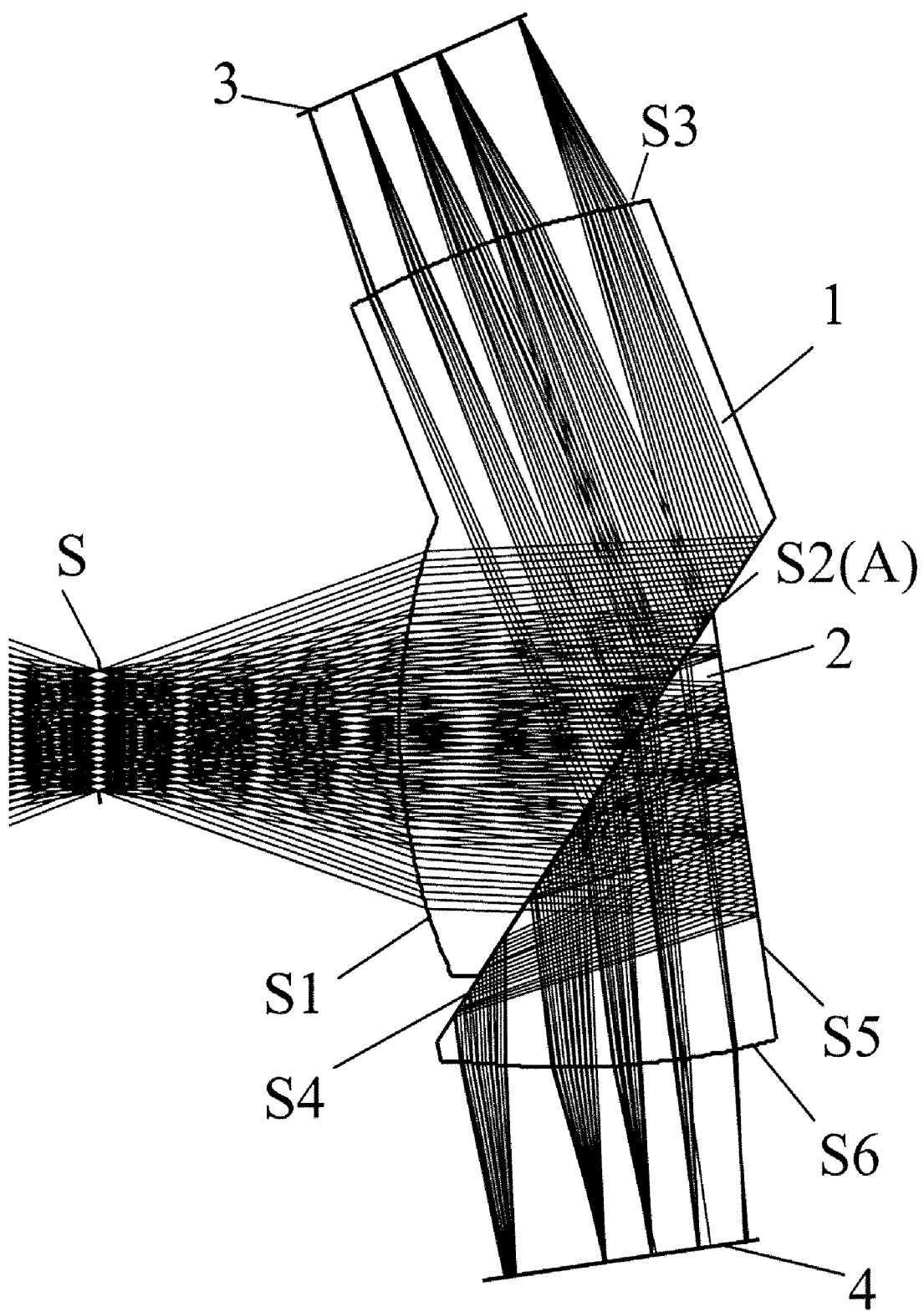
FIG. 9 is a horizontal sectional view showing the configuration of a display unit of an HMD that is a fifth embodiment (Embodiment 5) of the present invention.

FIG. 9 shows the configuration of a display unit used in an HMD that is a fifth embodiment (Embodiment 5) of the present invention. In this embodiment, first and second original images partially overlap each other as described in Embodiment 1 with reference to FIG. 2.

Figure 10A:
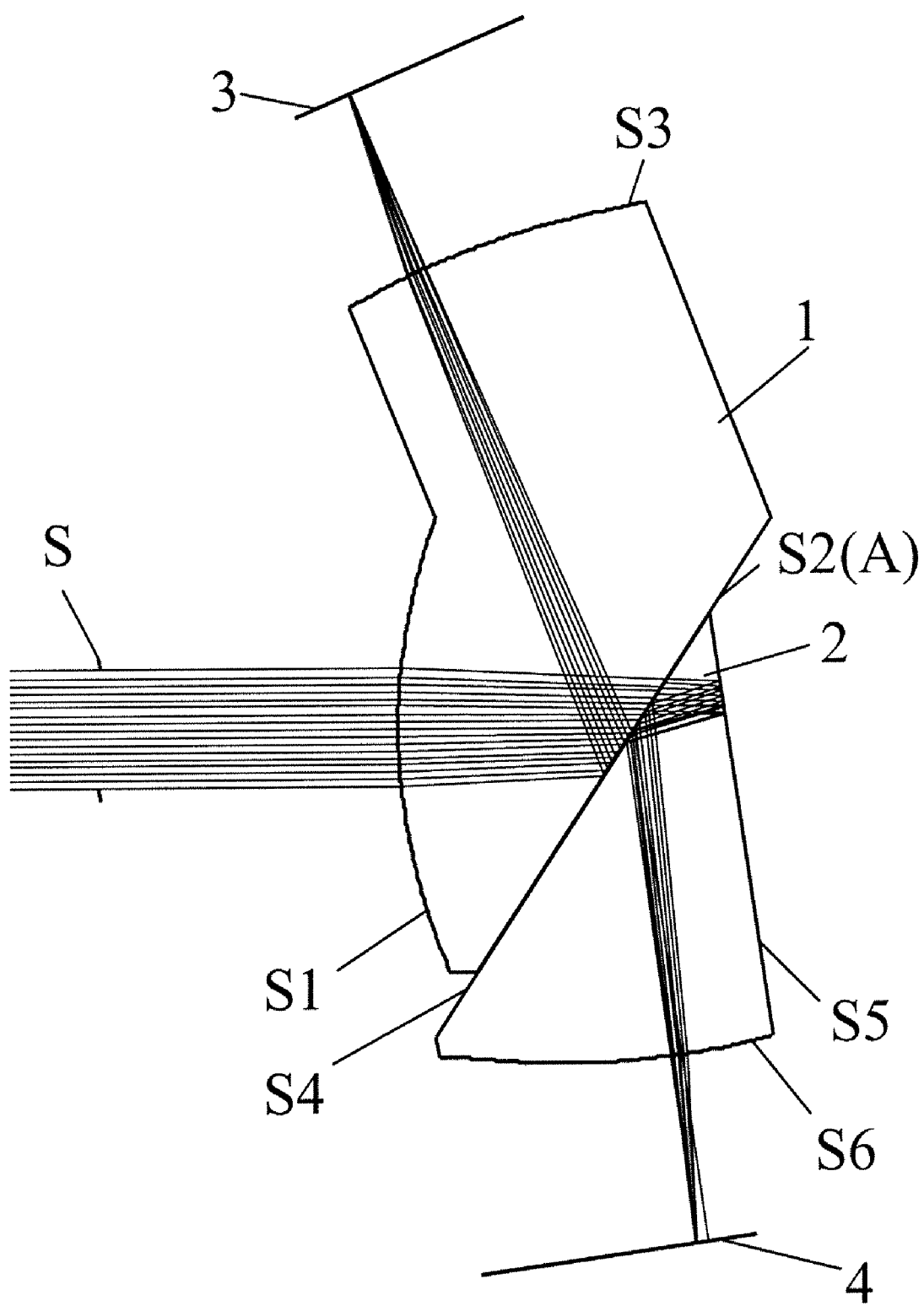
FIGS. 10A to 10C are horizontal sectional views showing an exit pupil complementarily formed by light fluxes from image height positions in an overlap area of original images.
Figure 10B:
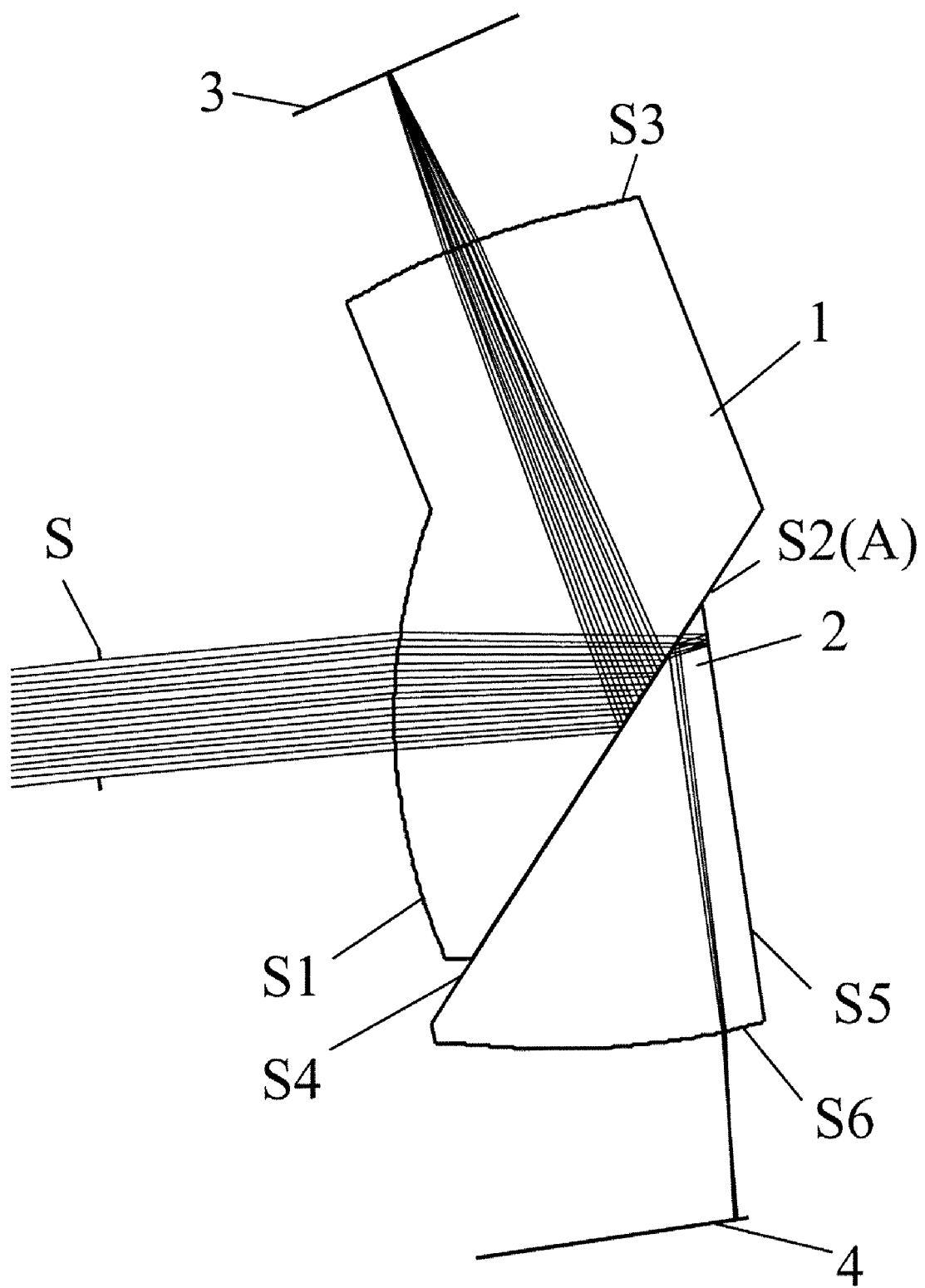
Figure 10C:
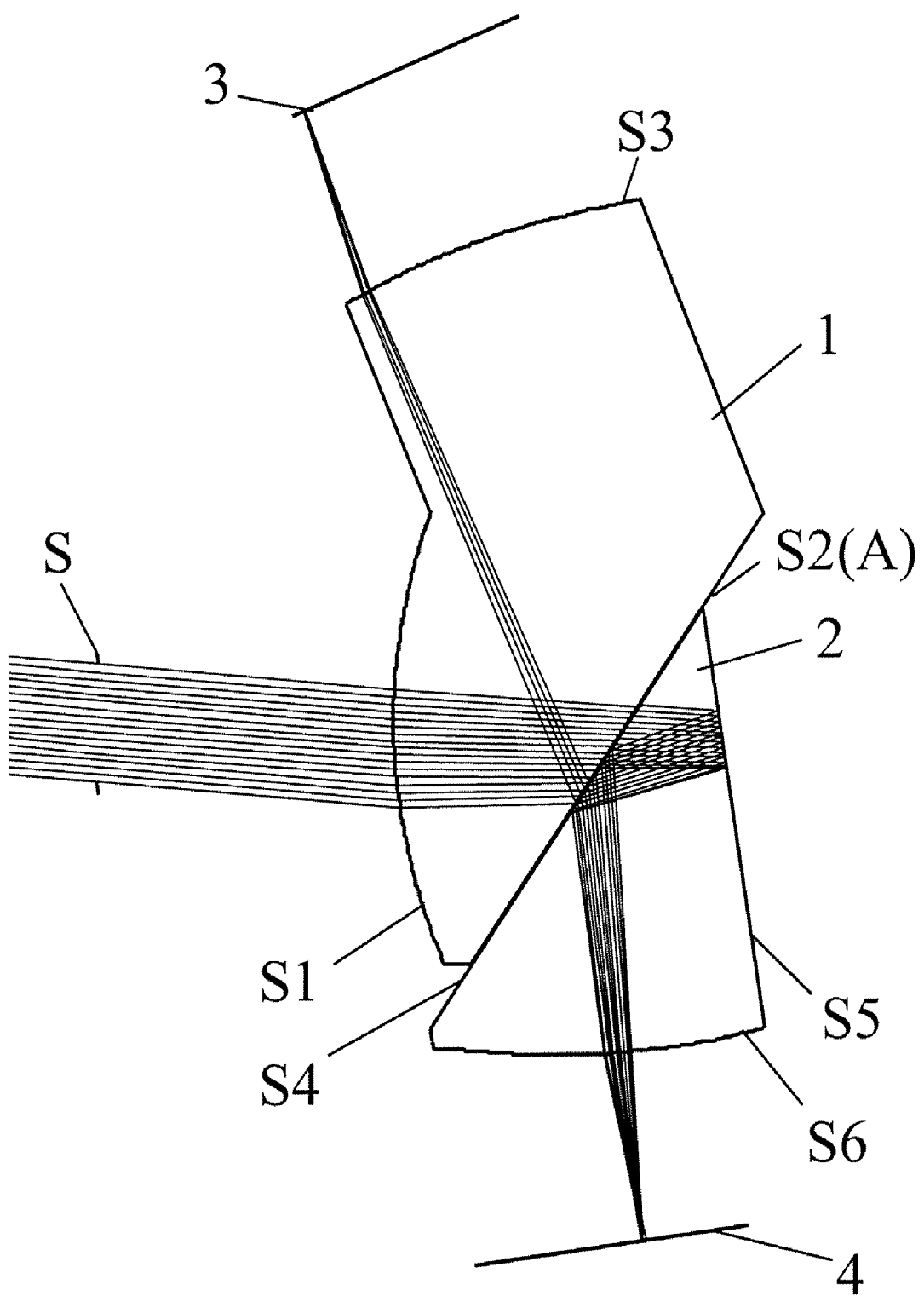

FIGS. 10A to 10C show that light fluxes from respective image height positions in the overlapping area of the original images complementarily form an exit pupil S in this embodiment. This embodiment uses the principle described in Embodiment 4 to cause first and second display elements 3 and 4 to display images of viewing angles different from each other in a direction of the Y-Z section, thus enabling reduction of the thickness of the observation optical system.

Further, this embodiment uses internal total reflection and transmission at one optical path combining surface as in Embodiment 4 to cause the incident angles of principal rays in light fluxes from one and the other of the two display elements 3 and 4 to the optical path combining surface to differ from each other when combining these light fluxes.

In this embodiment, a surface S2 of a first optical element 1 is an optical path combining surface A. The optical path combining surface S2 (A) of the first optical element 1 and a surface S4 of a second optical element 2 are disposed in parallel with and facing each other with a minute air space therebetween.

In a viewing angle range where the entire light flux from an entrance pupil (exit pupil S in the forward ray tracing) is internally totally reflected by the surface S2 in the backward ray tracing, an image corresponding only to the original image displayed on the first display element 3 is displayed. On the other hand, in a viewing angle range where the entire light flux from the entrance pupil is transmitted through the surface S2 in the backward ray tracing, an image corresponding only to the original image displayed on the second display element 4 is displayed. Further, in a viewing angle range where part of the light flux from the entrance pupil is internally totally reflected by the surface S2 and the remaining one is transmitted therethrough in the backward ray tracing, an image corresponding to the same partial original image overlappingly displayed on the first and second display elements 3 and 4 is displayed.

As described above, using the two original images displayed on the two display elements for the viewing angles different from each other in a direction of the section shown in the figures can realize a wide viewing angle observation optical system thinner than that when using one original image displayed on one display element.

Moreover, the second optical element 2 forms an optical path for causing the light flux from the second display element 3 to enter the second optical element 2 through a surface S6, to be totally reflected by the surface S4, to be reflected by a surface S5 and then to emerge from the second optical element 2 through the surface S4 toward the first optical element 1. Such a configuration folding the optical path using the plural reflective surfaces can further reduce the thickness of the observation optical system. Using the surface S4 as an internally totally reflective surface and a transmissive surface can reduce a loss of light amount in the observation optical system.

In this embodiment, since the incident angles of the principal rays themselves to the surface S2 are different from each other, the light fluxes reaching the exit pupil S have different widths from each other depending on the viewing angles. However, an area where only the light flux from the second display element 4 reaches and an area where only the light flux from the first display element 3 reaches complementarily form the exit pupil S, thereby enabling image observation in the entire area of the exit pupil S without any problem.

Also in this embodiment, as in Embodiment 4, it is desirable to provide for the second display element 4 the function of limiting the emergence angle of the light flux therefrom, to set the refractive index of each optical element to be high to a certain degree, and to set the air space between the surfaces S2 and S4 to be minute. This generates only a small width non-ray reaching area in the exit pupil S where the light fluxes reach from the two display elements 3 and 4, thus enabling image observation without any problem.

Also in this embodiment, as in Embodiment 4, the light flux from one of the display elements is internally totally reflected. This eliminates a reflective film, thus enabling reduction of the cost of the observation optical system and provision of a bright image.

Embodiment 6

Figure 11:
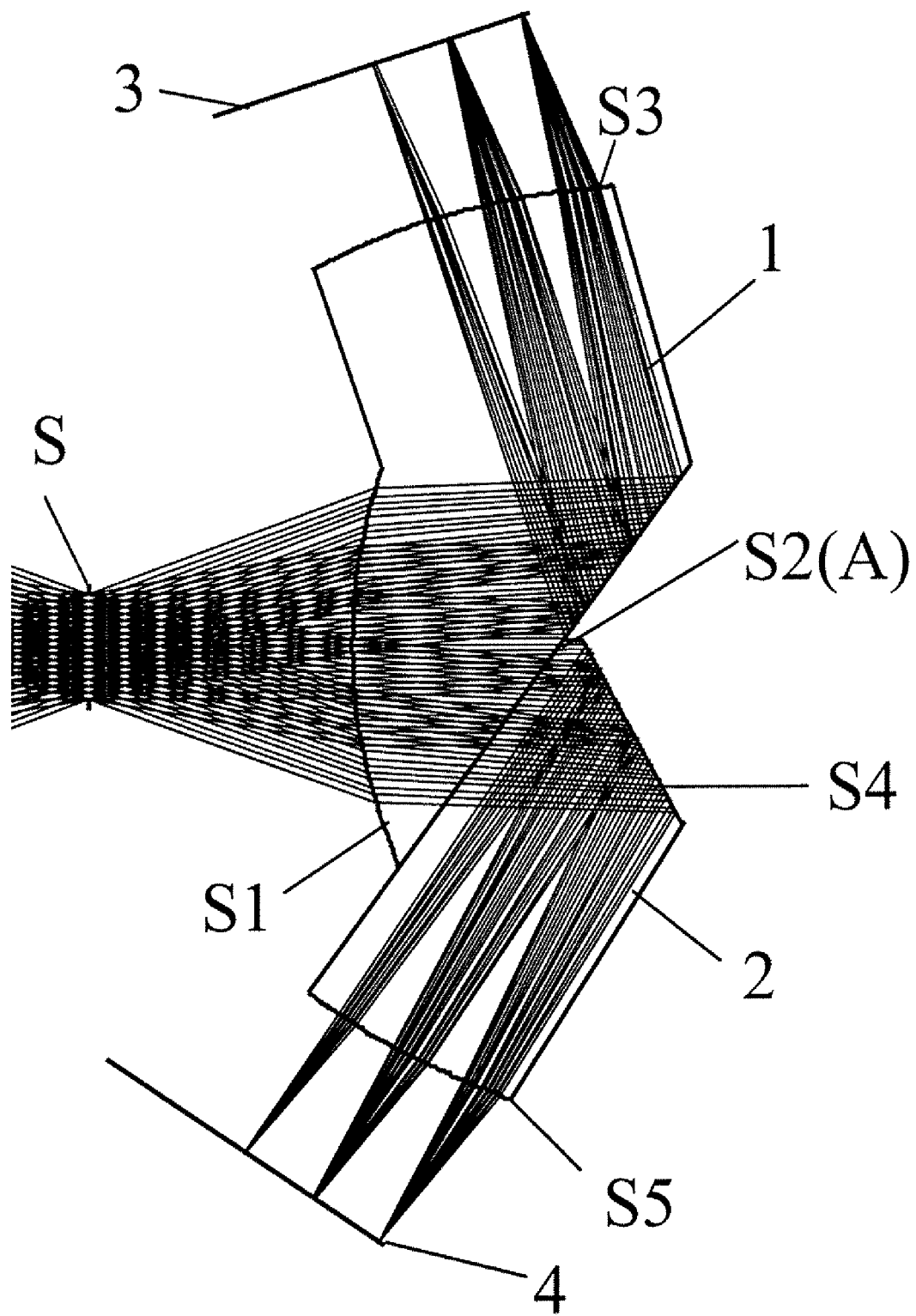
FIG. 11 is a horizontal sectional view showing the configuration of a display unit of an HMD that is a sixth embodiment (Embodiment 6) of the present invention.

FIG. 11 shows the configuration of a display unit used in an HMD that is a sixth embodiment (Embodiment 6) of the present invention. Also in this embodiment, first and second original images (that is, first and second optical paths at an optical path combining surface A (S2) described later) partially overlap each other.

Figure 12:
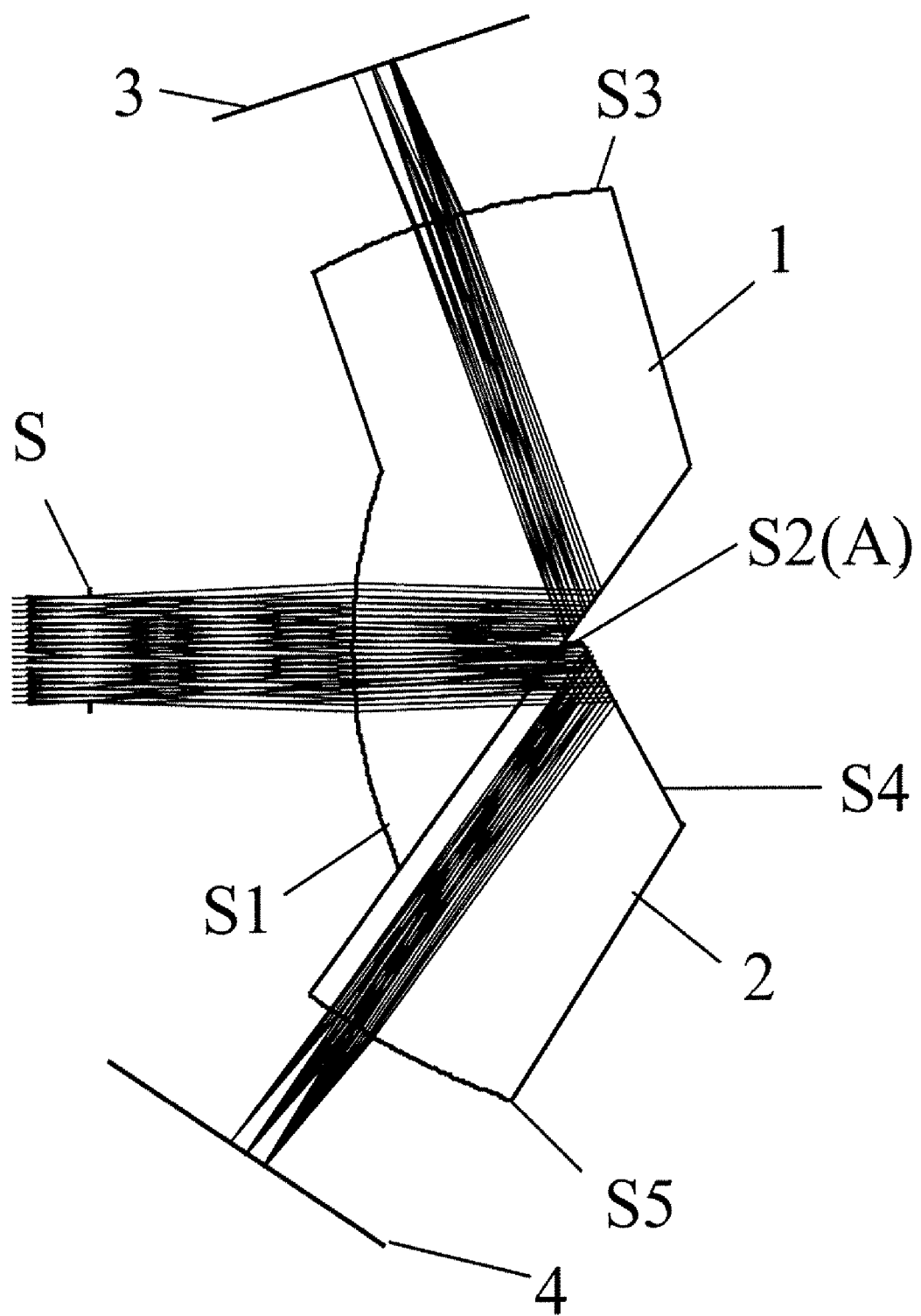
FIG. 12 is a horizontal sectional view showing an exit pupil complementarily formed by light fluxes from image height positions in an overlap area of original images.

FIG. 12 shows that light fluxes from respective image height positions in the overlapping area of the original images complementarily form an exit pupil S in this embodiment.

This embodiment is a modified example of Embodiment 5. In this embodiment, on an optical path separating surface S2 that is a single optical surface in the backward ray tracing (optical path combining surface in the forward ray tracing), there is an area where a light flux including a light flux portion that is internally totally reflected thereat and a light flux portion that is transmitted therethrough enters from an entrance pupil (exit pupil S in the forward ray tracing).

A first optical element 1 and a second optical element 2 are cemented at a certain region (hereinafter referred to as a cemented region) in the area where the light flux from the entrance pupil enters, the certain region being a region where the light flux portion that is transmitted through the optical path separating surface S2 enters. In other words, in this embodiment, the entire light flux entering a non-cemented region of the first and second optical element 1 and 2 on the optical path separating surface S2 reaches a first display element 3, and the entire light flux entering the cemented region of the first and second optical element 1 and 2 on the optical path separating surface S2 reaches a second display element 4.

It is desirable that a viewing angle range where an effective light flux from the entrance pupil includes the light flux portion which is internally totally reflected by the optical path separating surface S2 and the light flux portion which is transmitted therethrough in the backward ray tracing as shown in FIG. 12 be an overlapping display area where parts of the original images displayed on the first and second display elements 3 and 4 are identical to each other. This enables the complementary forming of the exit pupil S such that the formed exit pupil S substantially fills a predetermined exit pupil forming area.

This embodiment also can provide a bright image without forming a reflective film described in Embodiments 1 to 3. Further, this embodiment can ease the condition described in Embodiments 4 and 5 on the refractive index of the medium forming the optical element and the arrangement of the facing surfaces.

Note that unnecessary light due to scattering is not generated at the edge of the non-cemented region on the surface S2 that is a surface where the first optical element 1 is cemented with the second optical element 2, but the unnecessary light may be generated at the edge of the cemented region on the surface S2. To avoid the generation of the unnecessary light, it is desirable to provide light shielding to the edge of the cemented region.

Embodiment 7

Figure 13:
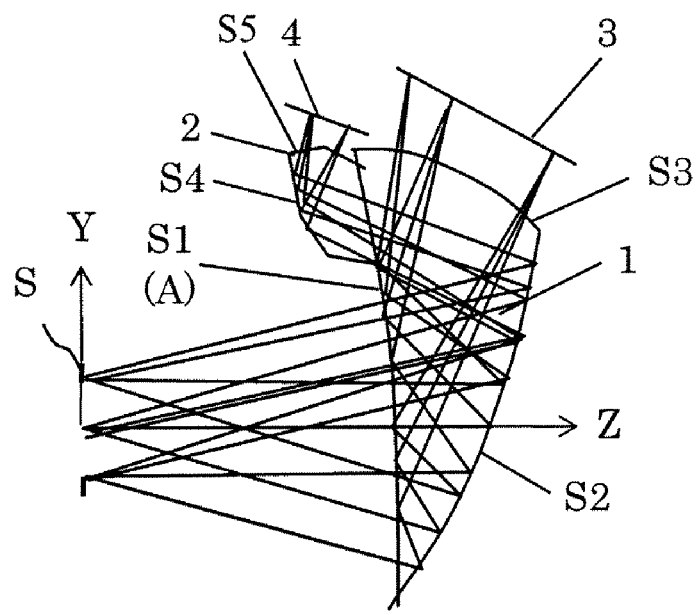
FIG. 13 is a horizontal sectional view showing the configuration of a display unit of an HMD that is a seventh embodiment (Embodiment 7) of the present invention.
Figure 14:
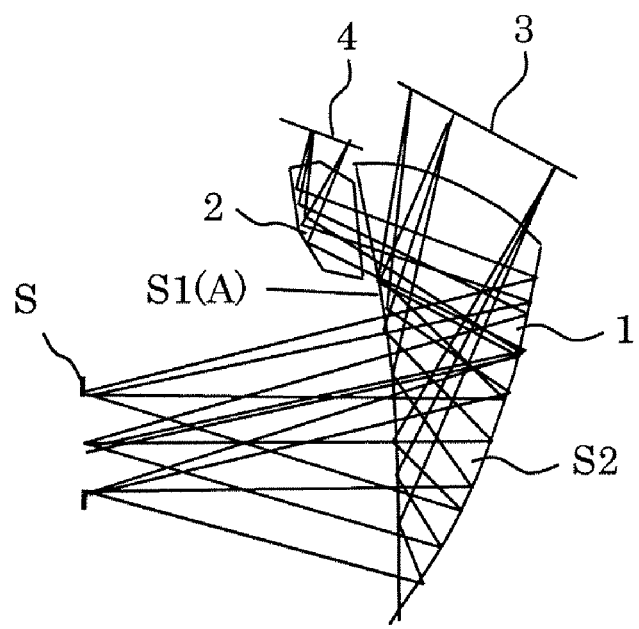
FIG. 14 is a horizontal sectional view showing a modified example of Embodiment 7.

FIG. 13 shows the configuration of a display unit used in an HMD that is a seventh embodiment (Embodiment 7) of the present invention. In this embodiment, a first optical element 1 in this embodiment uses plural decentered reflective curved surfaces to fold optical paths.

In this embodiment, all optical surfaces that constitute the first optical element 1 and include an optical path combining surface A (S1) as a single optical surface are curved surfaces. This configuration reduces the number of surfaces not used for image formation and aberration correction, thereby enabling forming of an observation optical system with high performance while having a reduced number of surfaces.

In order to achieve wide viewing angle display without increasing the thickness of the first optical element 1, it is necessary to increase the optical power of a concave reflective surface S2 mainly providing an image-forming effect in the backward ray tracing from an entrance pupil (exit pupil S in the forward ray tracing). However, the increase of the optical power of the concave reflective surface S2 makes it difficult to cause a light flux from a first display element 3 to be internally totally reflected by part of the surface S1 that is used as a transmissive surface and a reflective surface. In particular, this problem easily occurs in an upper viewing angle in FIG. 13.

To solve the problem, this embodiment employs in the backward ray tracing a configuration suitable for a wide viewing angle while providing an increased optical power to the surface S2. Specifically, this embodiment is configured such that part of the light flux of the upper viewing angle range, light flux which reaches the surface S1 from the entrance pupil to be transmitted therethrough and then is reflected by the surface S2 to impinge on the surface S1 again, is not internally totally reflected by the surface S1. In an area through which the light flux of the upper viewing angle range passes, part of the light flux being not internally totally reflected, a second optical element 2 is cemented with the first optical element 1 at the surface S1 such that the light flux of the upper viewing angle range is transmitted through the surface S1 to be introduced to a second display element 4.

This embodiment is further configured such that, in an area on the surface S1 with which the second optical element 2 is not cemented, the light flux from the entrance pupil in the backward ray tracing is transmitted through the surface (optical path separating surface) S1, is reflected by the surface S2 and then is internally totally reflected by the surface S1 to be introduced to the first display element 3. This configuration enables achieving of wide viewing angle display while using a thin and compact optical system and achieving of a bright observation optical system capable of reducing a loss of light amount.

In a viewing angle range where the entire light flux from the entrance pupil is internally totally reflected by the surface S1 in the backward ray tracing, the entire light flux reaches the first display element 3. On the other hand, in a viewing angle range where the entire light flux from the entrance pupil is introduced to the second optical element 2 cemented with the first optical element 1 at the surface S1, the entire light flux reaches the second display element 4.

Further, in a viewing angle range where part of the light flux from the entrance pupil is internally totally reflected by the surface S1 and the remaining one is introduced to the second optical element 2 in the backward ray tracing, the part of the light flux reaches the first display element 3 and the remaining one reaches the second display element 4.

In the backward ray tracing, in the viewing angle range where the part of the light flux reaches the first display element 3 and the remaining one reaches the second display element 4, the same original image is displayed on the first and second display elements 3 and 4. In the viewing angle range other than the above viewing angle range, the original images different from each other are displayed on the first and second display elements 3 and 4. This enables the complementary forming of the exit pupil S such that the formed exit pupil S substantially fills a predetermined exit pupil forming area.

The optical paths and the optical effects are hereinafter described in the forward ray tracing in which the light rays reach the exit pupil S from the display elements.

The light flux from the first display element 3 enters the first optical element 1 from a surface S3 and then impinges on the surface S1 at an incident angle equal to or larger than a critical angle of the surface S1 to be internally totally reflected thereby. The light flux internally totally reflected by the surface S1 is reflected by the surface S2, impinges on the surface S1 at an incident angle smaller than the critical angle to emerge from the first optical element 1, and then reaches the exit pupil S. An observer can observe an enlarged virtual image of the original image displayed on the first display element 3, the enlarged virtual image being formed by the optical powers of each surface of the first optical element 1.

The light flux from the second display element 4 enters the second optical element 2 from a surface S5, is reflected by a surface S4, and then enters the first optical element 1 from the surface S2. The light flux that has entered the first optical element 1 is reflected by the surface S2, impinges on the surface S1 at an incident angle smaller than the critical angle to emerge from the first optical element 1, and then reaches the exit pupil S. The observer can observe an enlarged virtual image of the original image displayed on the second display element 4, the enlarged virtual image being formed by the optical powers of the surfaces S5, S4, S2 and S1.

These optical effects can cause the observer placing his/her eye at the exit pupil position to observe an enlarged combined image of the different original images displayed on the first and second display elements 3 and 4 with the light fluxes from the first and second display elements 3 and 4.

In this embodiment, in the backward ray tracing from the entrance pupil (exit pupil S), the optical path separating surface S1 is disposed backward from the reflective surface S2 (on a display element side). In the forward ray tracing, this configuration folds the optical path from the first display element 3 and the optical path from the second display element 4 at the surface S1, the surface S2 and the surface S1 in the first optical element 1, resulting in a thin observation optical system.

In this embodiment, to combine images in the vertical direction as shown in FIG. 4, it is desirable to set the focal length in a section (X-Z section) perpendicular to a section (Y-Z section) including the optical path folding direction to be shorter than that in the Y-Z section. That is, it is desirable to set the optical power in the X-Z section to be stronger than that in the Y-Z section. This is because there are more restrictions in the Y-Z section in which the optical paths are folded than in the X-Z section and therefore the above-described configuration can easily provide a wider viewing angle.

This embodiment employs a configuration near that of Embodiment 6 by cementing the first and second optical elements 1 and 2. However, the first and second optical elements 1 and 2 may be disposed with a minute distance (air apace) therebetween to provide similar effects to those in Embodiment 5. Further, the optical path combining surface S1 may be a half-mirror surface or a polarization splitting surface to provide similar effects to those in Embodiments 1 and 2. However, using the internal total reflection as described in this embodiment can achieve a cost reduction and a high light use efficiency.

The use of a decentered curved surface as in this embodiment causes rotationally asymmetric decentering aberration. To correct this aberration, it is desirable to use at least one rotationally asymmetric surface.

Embodiment 8

Figure 15:
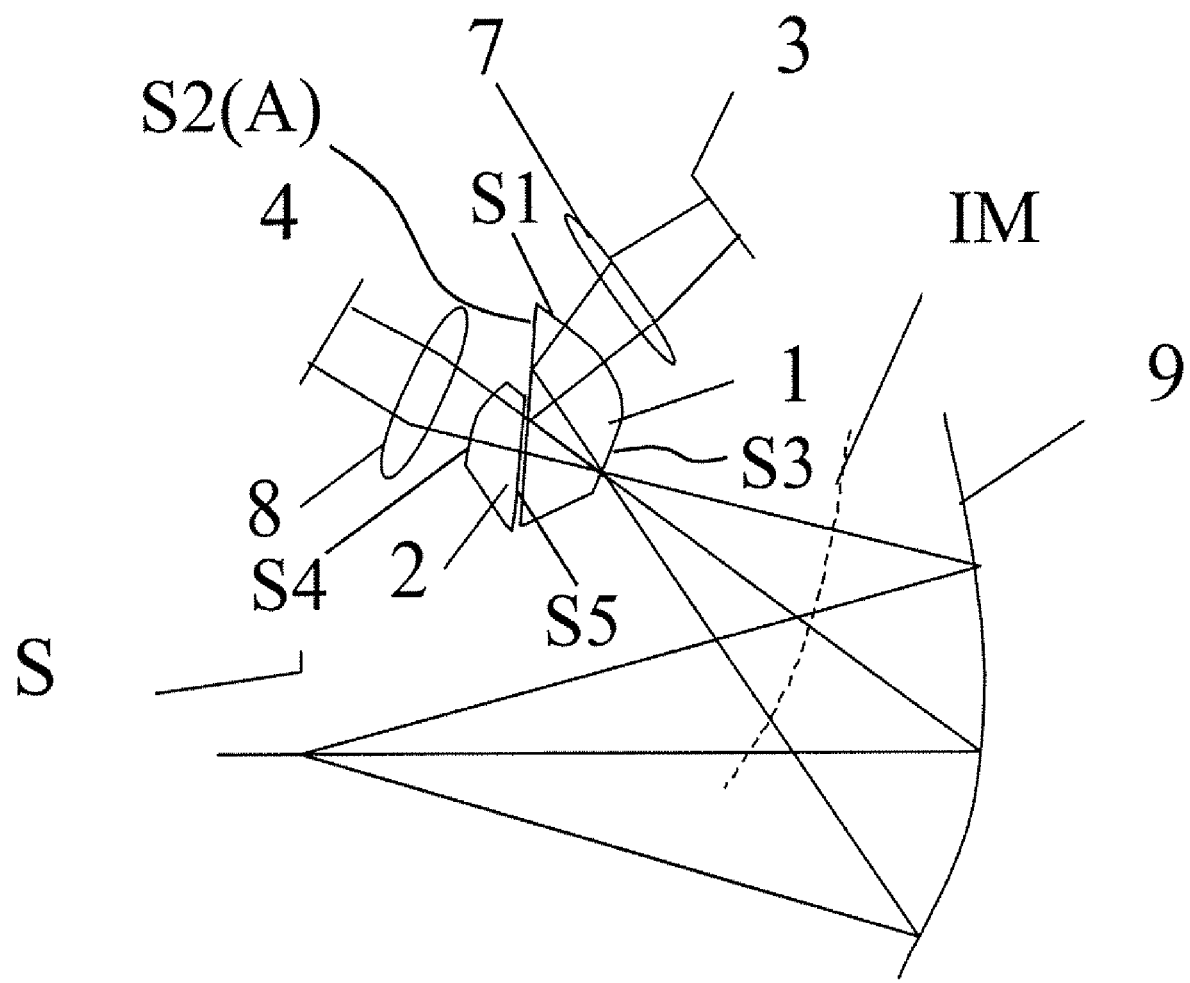
FIG. 15 is a horizontal sectional view showing the configuration of a display unit of an HMD that is an eighth embodiment (Embodiment 8) of the present invention.

Each of the above-described embodiments provides the enlarged virtual image to the observer by introducing the light fluxes to the exit pupil S without forming intermediate images of the original images. In contrast, an HMD that is an eighth embodiment (Embodiment 8) of the present invention shown in FIG. 15 introduces light fluxes to an exit pupil S after forming intermediate images of original images FIG. 15 shows only principal rays reaching the center of the exit pupil S to simplify the description on image combining.

Light flux from an original image displayed on a first display element 3 enters a first optical element 1 from a surface S1 via a lens 7. The light flux internally totally reflected by an optical path combining surface S2 as a single optical surface of the first optical element 1 emerges from the first optical element 1 through a surface S3, forms an intermediate image IM, and then reaches a concave mirror 9. The light flux reflected by the concave mirror 9 reaches the exit pupil S. An enlarged virtual image of the intermediate image IM is provided to an observer by a positive optical power of the concave mirror 9.

On the other hand, light flux from an original image displayed on a second display element 4 passes through a lens 8 and the second optical element 2, and then is transmitted through the optical path combining surface S2 to enter the first optical element 1. A surface S5 of the second optical element 2 and the optical path combining surface S2 are disposed with a small air layer (air space) therebetween. The light flux that has entered the first optical element 1 emerges from the first optical element 1 through the surface S3.

The light flux that has emerged from the first optical element 1 forms an intermediate image IM, and then reaches the concave mirror 9. The light flux reflected by the concave mirror 9 reaches the exit pupil S. An enlarged virtual image of the intermediate image IM is provided to the observer by the positive optical power of the concave mirror 9. This configuration can cause the observer to observe an enlarged combined image corresponding to the original images displayed on the first and second display elements 3 and 4.

This embodiment uses the concave mirror 9 as an ocular (eyepiece) optical system and disposes the first optical element 1 in a relay optical system between the original images and the intermediated images IM thereof, the first optical element 1 including the optical path combining surface S2 (A) and being shared by the light fluxes from the first and second display elements 3 and 4. However, an alternative embodiment of the present invention is not limited thereto.

For example, a configuration for providing a combined image may be employed in which a shared optical element including an optical path combining surface is disposed in an ocular optical system, and light fluxes from plural original images are introduced to the optical path combining surface in the ocular optical system through plural relay optical systems.

Embodiment 9

Each of the above-described embodiments reflects the light flux by the optical path combining surface that is formed inside the first optical element 1 and uses the two display elements (two original images). However, an alternative embodiment of the present invention is not limited thereto.

Figure 16:
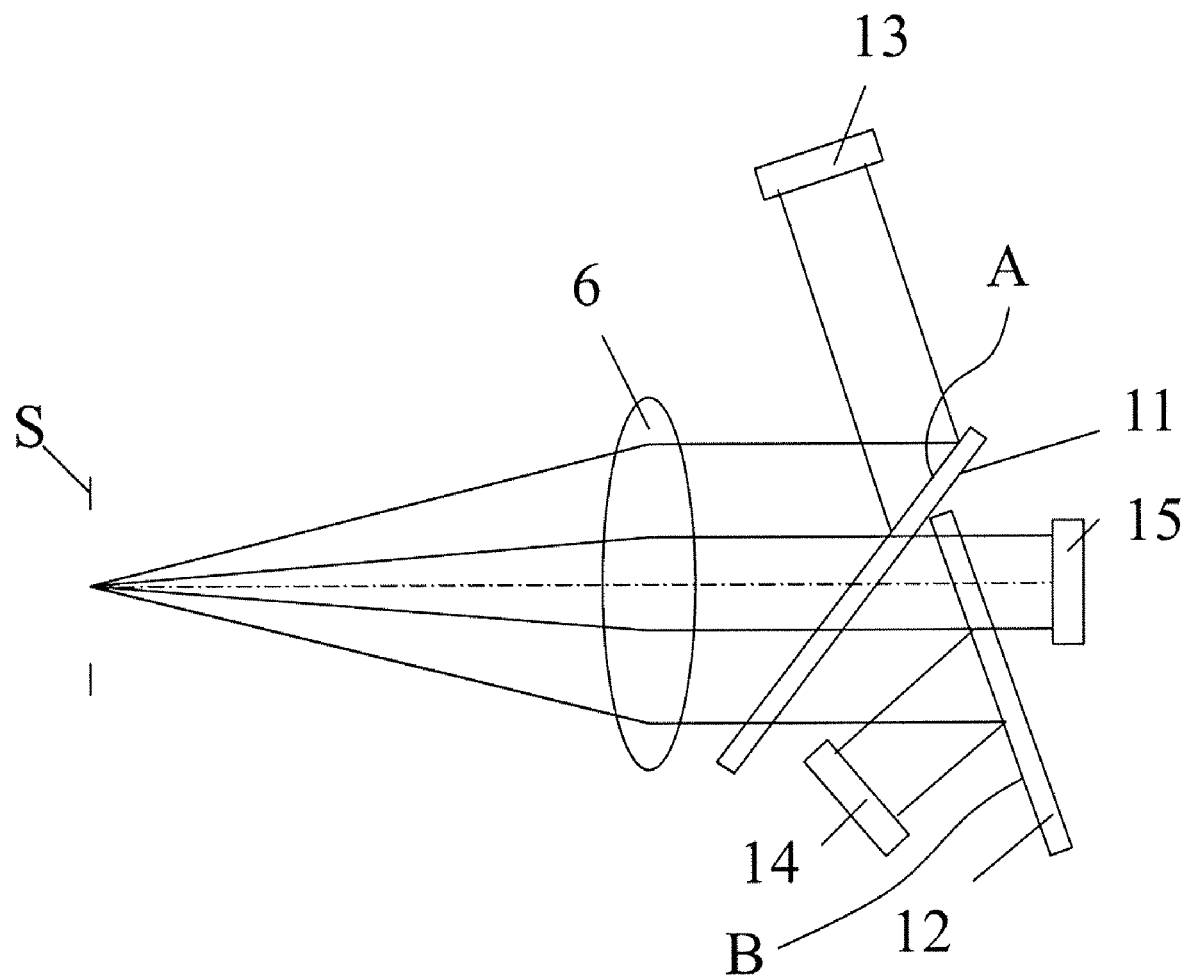
FIG. 16 is a horizontal sectional view showing the configuration of a display unit of an HMD that is a ninth embodiment (Embodiment 9) of the present invention.

FIG. 16 shows the configuration of a display unit used in an HMD that is a ninth embodiment (Embodiment 9) of the present invention.

A first optical element 11 and a second optical element 12 are respectively formed as a half-mirror plate. The half-mirror plate is constituted by a thin translucent substrate and a half-transmissive reflective film formed on an exit pupil side surface (half-mirror surface) that is a single optical surface of the substrate.

The first optical element 11 is a shared optical element through which light fluxes from first to third display elements 13 to 15 pass by reflection or transmission. The second optical element 12 is another shared optical element through which light fluxes from the second and third display elements 14 and 15 pass by reflection or transmission. In this embodiment, the half-mirror surface of the first optical element 11 is hereinafter referred to as the optical path combining surface A, and the half-mirror surface of the second optical element 12 is hereinafter referred to as the optical path combining surface B.

The light flux from the first display element 13 is reflected by the optical path combining surface A of the first optical element 11 to be introduced to an exit pupil S through a lens 6. The light flux from the second display element 14 is reflected by the optical path combining surface B of the second optical element 12 and then is transmitted through the first optical element 11 to be introduced to the exit pupil S through the lens 6.

The light flux from the third display element 15 is transmitted through the first and second optical elements 11 and 12 to be introduced to the exit pupil S through the lens 6. FIG. 16 shows only principal rays reaching the center of the exit pupil S to simplify the description on image combining.

The first and second display elements 13 and 14 in this embodiment correspond to the first and second image-forming elements in the present invention for the first optical element 11. The second and third display elements 14 and 15 in this embodiment correspond to the first and second image-forming elements in the present invention for the second optical element 12.

The light fluxes from the second and third display elements 14 and 15 pass through the half-mirror plate (11, 12) one more time than the light flux from the first display element 13 does. Therefore, it is desirable that the second and third display elements 14 and 15 display the original images with a display luminance twice as high as that of the first display element 13.

The following optical elements may be used instead of the above-described half-mirror plate. On the translucent substrate constituting the first optical element 11, a reflective film is formed only in an area reflecting the light flux from the first display element 13. Further, on the translucent substrate constituting the second optical element 12, a reflective film is formed only in an area reflecting the light flux from the second display element 14. When using these optical elements, the second and third display elements 14 and 15 may display the original images with the same display luminance as that of the first display element 13.

This embodiment uses the two optical path combining surfaces A and B to combine three images corresponding to the original images displayed on the three display elements 13 to 15. This can provide a wider viewing angle compared to the size of each display element (each original image). The use of two or more optical path combining surfaces to provide a wider viewing angle in this manner can be applied to Embodiments 1 to 8 described above.

Each of the above-described embodiments introduces the light fluxes from the first and second image-forming elements forming the original images corresponding to viewing fields different from each other to the exit pupil position through reflection and transmission at the same surface (single optical surface) having no joint line. Thus, each of the above-described embodiments can realize a compact image observation apparatus capable of providing a wide display viewing angle while suppressing generation of light scattering, flare and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2007-163070, filed on Jun. 20, 2007, which is hereby incorporated by reference herein in its entirety.

What is claimed is:

1. An image observation apparatus comprising:
   a first image-forming element and a second image-forming element each of which forms an original image; and
   an optical system configured to introduce light fluxes from the first and second image-forming elements to an exit pupil position of the optical system where an eye of an observer is placed,
   wherein the optical system includes an optical surface as a single surface that reflects the light flux from the first image-forming element and transmits the light flux from the second image-forming element, and
   wherein the first image-forming element and the second image-forming element respectively form a first original image and a second original image that correspond to different viewing fields from the exit pupil position
   wherein the optical surface includes a first area in which a reflective film is formed and a second area in which the reflective film is not formed.

2. The image observation apparatus according to claim 1, wherein, on the optical surface, an optical path of the light flux from the first image-forming element and an optical path of the light flux from the second image-forming element are adjacent to each other or at least partially overlap each other.

3. The image observation apparatus according to claim 1, wherein the optical surface includes a third area in which a half-transmissive reflective film is formed between the first and second areas.

4. The image observation apparatus according to claim 1, wherein the optical system includes:
   a first optical element that includes the optical surface and reflects the light flux from the first image-forming element at the optical surface; and
   a second optical element that reflects the light flux from the second image-forming element toward the optical surface.

5. The image observation apparatus according to claim 1, wherein the optical system includes:

a first optical element that includes the optical surface and reflects the light flux from the first image-forming element at the optical surface; and a second optical element that transmits the light flux from the second image-forming element proceeding toward the optical surface.

6. An image observation system comprising:

the image observation apparatus according to claim 1; and a driver that causes the first and second image-forming elements to form the first and second original images.

* * * * *